US012626650B2

(12) United States Patent
Shim et al.

(10) Patent No.: US 12,626,650 B2
(45) Date of Patent: May 12, 2026

(54) PIXEL OF A DISPLAY DEVICE, AND DISPLAY DEVICE

(71) Applicant: SAMSUNG DISPLAY CO., LTD., Yongin-si (KR)

(72) Inventors: Jongsik Shim, Yongin-si (KR); Soon-Gi Kwon, Yongin-si (KR); Donghyun Kim, Yongin-si (KR); Junyoung Min, Yongin-si (KR); Jun-Yong An, Yongin-si (KR); Chanyoung Yang, Yongin-si (KR); Seunghee Lee, Yongin-si (KR); Junwon Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/977,136

(22) Filed: Dec. 11, 2024

(65) Prior Publication Data

US 2025/0232711 A1 Jul. 17, 2025

(30) Foreign Application Priority Data

Jan. 16, 2024 (KR) ........................ 10-2024-0006576

(51) Int. Cl.
*G09G 3/3233* (2016.01)
*G09G 3/32* (2016.01)

(52) U.S. Cl.
CPC ............. *G09G 3/32* (2013.01); *G09G 3/3233* (2013.01); *G09G 2310/08* (2013.01); *G09G 2330/021* (2013.01)

(58) Field of Classification Search
CPC ................... G09G 3/32; G09G 3/3233; G09G 2300/0819; G09G 2300/0842;
(Continued)

(56) References Cited

U.S. PATENT DOCUMENTS

2016/0042694 A1 2/2016 Lim et al.
2019/0266941 A1* 8/2019 Pyo ...................... G09G 3/3225
(Continued)

FOREIGN PATENT DOCUMENTS

CN 117238247 A * 12/2023 ........... G09G 3/3233
KR 10-2016-0018892 2/2016
(Continued)

OTHER PUBLICATIONS

Extended European Search Report dated Apr. 22, 2025 from the European Patent Office issued in corresponding European Patent Application No. 25150200.1.

*Primary Examiner* — Stephen G Sherman
(74) *Attorney, Agent, or Firm* — F. CHAU & ASSOCIATES, LLC

(57) ABSTRACT

A pixel includes a first transistor including a first and second gates, a first capacitor connected between a first node and a third node, a second capacitor connected between a fourth node and the third node, a second transistor receiving a first scan signal and connected between a data line and the first node, a third transistor receiving a second scan signal and connected between a reference voltage line and the first node, a fourth transistor receiving a third scan signal and connected between an initialization line and the third node, a fifth transistor receiving an emission signal and connected between a first power line and the second node, a sixth transistor receiving the second scan signal and connected between the fourth node and the second node, and a light emitting element connected between the third node and a second power line.

20 Claims, 19 Drawing Sheets

(58) Field of Classification Search
CPC ... G09G 2300/0852; G09G 2300/0861; G09G 2300/0876; G09G 2310/08; G09G 2310/0251; G09G 2320/045; G09G 2330/021
See application file for complete search history.

(56) References Cited

U.S. PATENT DOCUMENTS

| | | | |
|---|---|---|---|
| 2023/0066949 | A1 | 3/2023 | Jeong et al. |
| 2024/0324337 | A1 | 9/2024 | Shim et al. |

FOREIGN PATENT DOCUMENTS

| | | | |
|---|---|---|---|
| KR | 10-2024-0143621 | | 10/2024 |
| WO | 2023220113 | | 11/2023 |
| WO | 2024196027 | A1 | 9/2024 |

* cited by examiner

PIXEL OF A DISPLAY DEVICE, AND DISPLAY DEVICE

CROSS-REFERENCE TO RELATED APPLICATION(S)

This patent application claims priority under 35 USC § 119 to Korean Patent Application No. 10-2024-0006576, filed on Jan. 16, 2024, in the Korean Intellectual Property Office (KIPO), the disclosure of which is incorporated by reference in its entirety herein.

1. TECHNICAL FIELD

Embodiments of the present inventive concept are directed to a display device, and more particularly to a pixel and a display device including the pixel.

2. DISCUSSION OF RELATED ART

Display devices having a flat panel display are a category of visual display technology that a typically thin and light weight, in contrast with bulkier cathode ray tube (CRT) displays. Examples of the flat panel display include a liquid crystal display (LCD), a light-emitting-diode (LED) display and an organic-light-emitting-diode (OLED) display. A flat panel display includes multiple pixels for presenting an image.

The pixel may include a storage capacitor, a scan transistor that transfers a data voltage to the storage capacitor in response to a scan signal, a driving transistor that generates a current based on the data voltage stored in the storage capacitor, and a light emitting element that emits light based on the current generated by the driving transistor.

The pixel may not emit light with a desired luminance when a threshold voltage of the driving transistor has an improper level. A compensation operation may be performed that compensates the threshold voltage of the driving transistor to reduce a luminance error caused by the improper level. However, the compensation operation may use an excessive amount of power. Further, horizontal crosstalk may occur due to the configuration of the pixel, thereby reducing image quality. Thus, there is a need for a pixel that uses less power and provides higher quality images.

SUMMARY

Some embodiments provide a pixel having an increased image quality and reduced power consumption, and display device including the pixel.

According to an embodiment, there is provided a pixel of a display device including first through seventh transistors, first and second capacitors and a light emitting element. The first transistor includes a first gate connected to a first node, a first terminal connected to a second node, a second terminal connected to a third node, and a second gate connected to a fourth node. The first capacitor includes a first electrode connected to the first node, and a second electrode connected to the third node. The second capacitor includes a first electrode connected to the fourth node, and a second electrode connected to the third node, a second transistor including a gate which receives a first scan signal, a first terminal connected to a data line which transfers a data voltage, and a second terminal connected to the first node. The third transistor includes a gate which receives a second scan signal, a first terminal connected to a line which transfers a reference voltage, and a second terminal connected to the first node. The fourth transistor includes a gate which receives a third scan signal, a first terminal connected to a line which transfers an initialization voltage, and a second terminal connected to the third node. The fifth transistor includes a gate which receives an emission signal, a first terminal connected to a line which transfers a first power supply voltage, and a second terminal connected to the second node. The sixth transistor includes a gate which receives the second scan signal, a first terminal connected to the fourth node, and a second terminal connected to the second node. The light emitting element is connected between the third node and a line which transfers a second power supply voltage.

In embodiments, the first capacitor may store a voltage difference between the data voltage and the initialization voltage, and the second capacitor may store a threshold voltage of the first transistor.

In embodiments, in a compensation period, the third transistor may apply the reference voltage to the first node, the fourth transistor may apply the initialization voltage to the third node, the sixth transistor may diode-connect the first transistor by connecting the fourth node to the second node, and the second capacitor may store a threshold voltage of the first transistor in a diode connection manner.

In embodiments, the initialization voltage may be higher than the reference voltage.

In embodiments, in the compensation period, a negative gate-source voltage may be applied to the first transistor, and the threshold voltage of the first transistor may be shifted in a positive direction.

In embodiments, the first gate of the first transistor may be a top gate located above an active region, and the second gate of the first transistor may be a bottom gate located under the active region.

In embodiments, the first gate of the first transistor may be a bottom gate located under an active region, and the second gate of the first transistor may be a top gate located above the active region.

In embodiments, the third scan signal may be the same as the second scan signal.

In embodiments, the pixel may further include a seventh transistor including a gate which receives a fourth scan signal, a first terminal connected to the line which transfers the first power supply voltage, and a second terminal connected to the fourth node.

In embodiments, frame periods for the display device may include a compensation frame period in which the pixel performs a threshold voltage compensation operation, and a non-compensation frame period in which the pixel does not perform the threshold voltage compensation operation.

In embodiments, the compensation frame period may include an initialization period in which the third node and the fourth node are initialized, a compensation period in which the threshold voltage compensation operation is performed to store a threshold voltage of the first transistor in the second capacitor, a writing period in which a voltage difference between the data voltage and the initialization voltage is stored in the first capacitor, and an emission period in which the light emitting element emits light.

In embodiments, in the initialization period, the third scan signal and the fourth scan signal may have an on-level, the first scan signal, the second scan signal and the emission signal may have an off-level, the fourth transistor may be turned on in response to the third scan signal having the on-level, and may apply the initialization voltage to the third node, the seventh transistor may be turned on in response to the fourth scan signal having the on-level, and applies the first power supply voltage to the fourth node, the third node may be initialized based on the initialization voltage, and the fourth node may be initialized based on the first power supply voltage.

In embodiments, in the compensation period, the second scan signal and the third scan signal may have an on-level, the first scan signal, the fourth scan signal and the emission signal may have an off-level, the third transistor may be turned on in response to the second scan signal having the on-level, and may apply the reference voltage to the first node, the fourth transistor may be turned on in response to the third scan signal having the on-level, and applies the initialization voltage to the third node, the sixth transistor may be turned on in response to the second scan signal having the on-level, and diode-connects the first transistor by connecting the fourth node to the second node, and the second capacitor may store the threshold voltage of the first transistor in a diode connection manner.

In embodiments, in the writing period, the first scan signal and the third scan signal may have an on-level, the second scan signal, the fourth scan signal and the emission signal may have an off-level, the second transistor may be turned on in response to the first scan signal having the on-level, and may apply the data voltage to the first node, the fourth transistor may be turned on in response to the third scan signal having the on-level, and applies the initialization voltage to the third node, and the first capacitor may store the voltage difference between the data voltage and the initialization voltage.

In embodiments, in the emission period, the emission signal may have an on-level, the first scan signal, the second scan signal, the third scan signal and the fourth scan signal may have an off-level, the fifth transistor may be turned on in response to the emission signal having the on-level, and connects the line which transfers the first power supply voltage and the second node, the first transistor may generate a driving current based on the voltage difference between the data voltage and the initialization voltage stored in the first capacitor, and the threshold voltage of the first transistor stored in the second capacitor, and the light emitting element may emit light based on the driving current.

In embodiments, the non-compensation frame period includes a writing period in which a voltage difference between the data voltage and the initialization voltage is stored in the first capacitor, and an emission period in which the light emission element emits light, and the non-compensation frame period does not include an initialization period and a compensation period.

In embodiments, the first through seventh transistors may be n-type metal oxide semiconductor (NMOS) transistors.

In embodiments, the first transistor may be an NMOS transistor, and at least one of the second through seventh transistors may be a p-type metal oxide semiconductor (PMOS) transistor.

According to an embodiment, there is provided a pixel of a display device including first through seventh transistors, first and second capacitors, and a light emitting element. The first transistor includes a first gate connected to a first node, a first terminal connected to a second node, a second terminal connected to a third node, and a second gate connected to a fourth node. The first capacitor includes a first electrode connected to the first node, and a second electrode connected to the third node. The second capacitor includes a first electrode connected to the fourth node, and a second electrode connected to the third node, a second transistor including a gate which receives a first scan signal, a first terminal connected to a data line which transfers a data voltage, and a second terminal connected to the first node. The third transistor includes a gate which receives a second scan signal, a first terminal connected to a line which transfers a reference voltage, and a second terminal connected to the first node. The fourth transistor includes a gate which receives a third scan signal, a first terminal connected to a line which transfers an initialization voltage, and a second terminal connected to the third node. The fifth transistor includes a gate which receives an emission signal, a first terminal connected to a line which transfers a first power supply voltage, and a second terminal connected to the second node. The sixth transistor includes a gate which receives the second scan signal, a first terminal connected to the fourth node, and a second terminal connected to the second node. The seventh transistor includes a gate which receives a fourth scan signal, a first terminal connected to the line which transfers the first power supply voltage, and a second terminal connected to the fourth node. The light emitting element is connected between the third node and a line which transfers a second power supply voltage. The first capacitor stores a voltage difference between the data voltage and the initialization voltage, and the second capacitor stores a threshold voltage of the first transistor in a diode connection manner.

According to an embodiment, there is provided a display device including a display panel including a plurality of pixels, a data driver configured to provide a data voltage to each of the plurality of pixels, a scan driver configured to provide a first scan signal, a second scan signal and a third scan signal to each of the plurality of pixels, an emission driver configured to provide an emission signal to each of the plurality of pixels, and a controller configured to control the data driver, the scan driver and the emission driver. Each of the plurality of pixels includes first through sixth transistors, first and second capacitors, and a light emitting element. The first transistor includes a first gate connected to a first node, a first terminal connected to a second node, a second terminal connected to a third node, and a second gate connected to a fourth node. The first capacitor includes a first electrode connected to the first node, and a second electrode connected to the third node. The second capacitor includes a first electrode connected to the fourth node, and a second electrode connected to the third node. The second transistor includes a gate which receives the first scan signal, a first terminal connected to a data line which transfers the data voltage, and a second terminal connected to the first node. The third transistor includes a gate which receives the second scan signal, a first terminal connected to a line which transfers a reference voltage, and a second terminal connected to the first node. The fourth transistor includes a gate which receives the third scan signal, a first terminal connected to a line which transfers an initialization voltage, and a second terminal connected to the third node. The fifth transistor includes a gate which receives the emission signal, a first terminal connected to a line which transfers a first power supply voltage, and a second terminal connected to the second node. The sixth transistor includes a gate which receives the second scan signal, a first terminal connected to the fourth node, and a second terminal connected to the second node. The light emitting element is connected between the third node and a line which transfers a second power supply voltage.

As described above, a pixel of a display device according to embodiments may include a first transistor having a double gate structure including a first gate (e.g., a top gate) and a second gate (e.g., a bottom gate), a first capacitor connected between the first gate of the first transistor and a second terminal (e.g., a source) of the first transistor, and a second capacitor connected between the second gate of the first transistor and the second terminal of the first transistor. The first capacitor may store a data voltage (or a voltage difference between the data voltage and an initialization voltage), and the second capacitor may store a threshold voltage of the first transistor in a diode connection manner. Accordingly, an image quality of the display device may be increased, and power consumption of the display device may be reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

Hereinafter, embodiments of the present inventive concept will be explained in detail with reference to the accompanying drawings.

Figure 1:
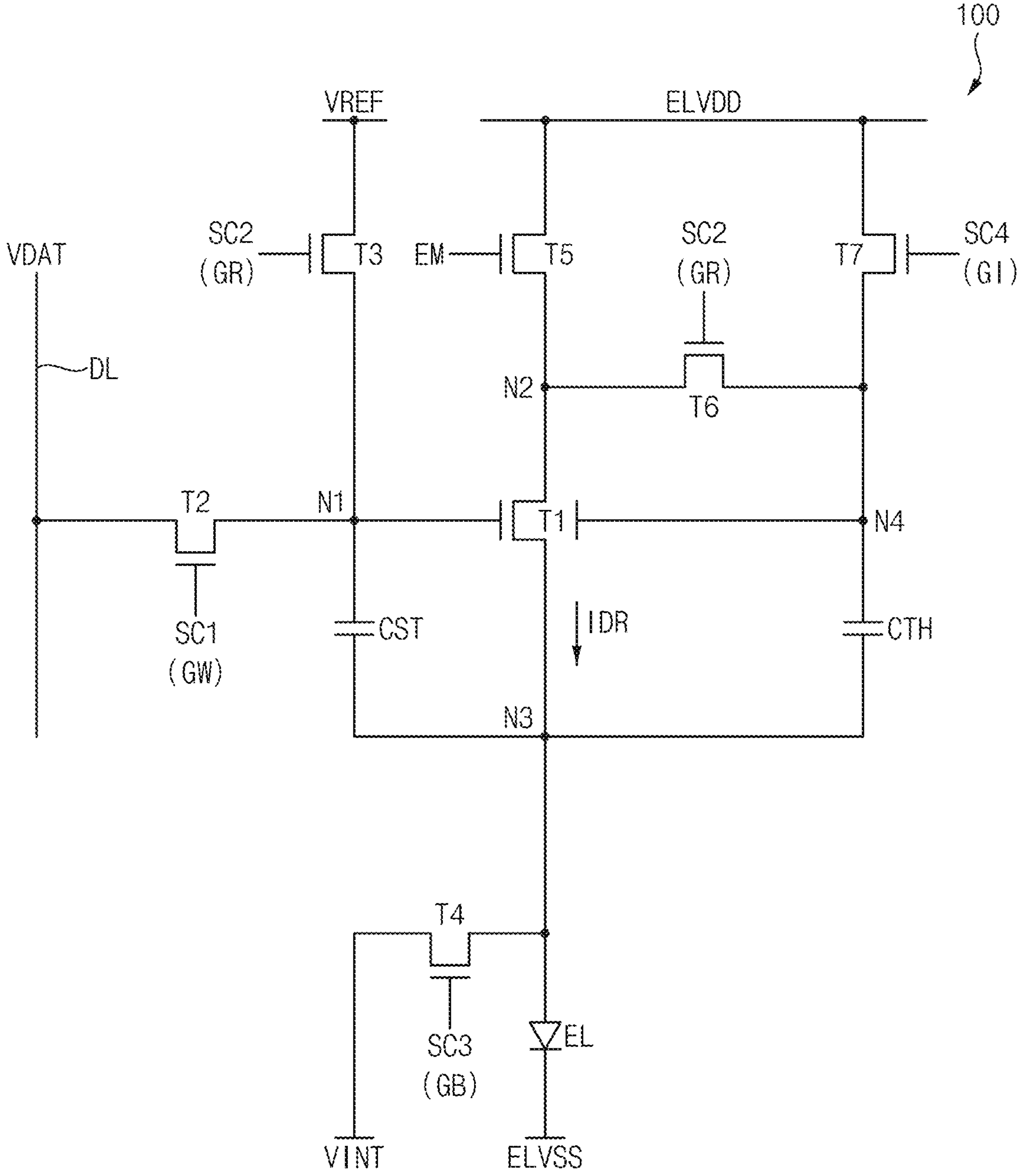
FIG. 1 is a circuit diagram illustrating a pixel of a display device according to an embodiment.
Figure 2:
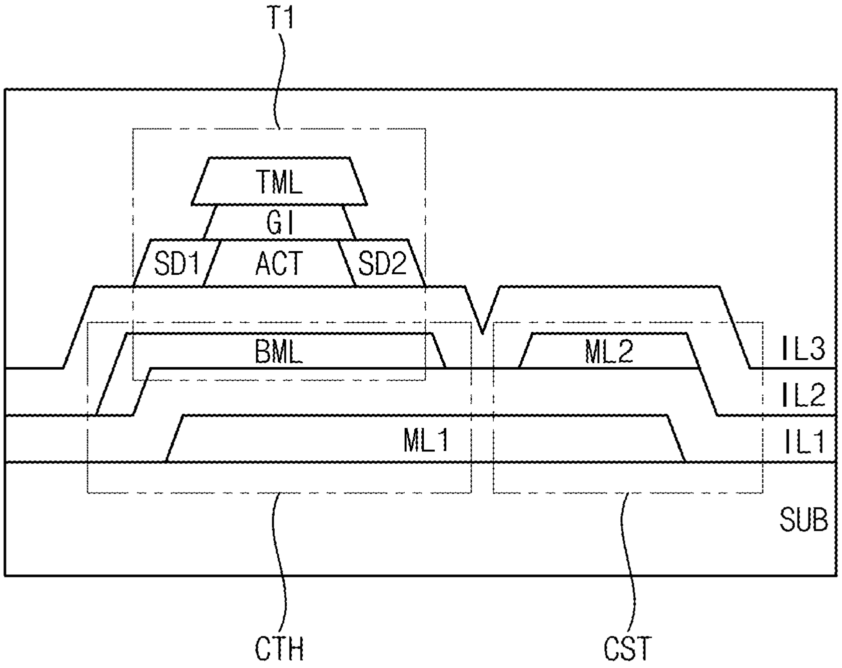
FIG. 2 is a cross-sectional diagram illustrating an example of a portion of a pixel of FIG. 1.

FIG. 1 is a circuit diagram illustrating a pixel of a display device according to an embodiment, and FIG. 2 is a cross-sectional diagram illustrating an example of a portion of a pixel of FIG. 1.

Referring to FIG. 1, a pixel 100 according to an embodiment includes a first transistor T1, a first capacitor CST, a second capacitor CTH, a second transistor T2, a third transistor T3, a fourth transistor T4, a fifth transistor T5*a* sixth transistor T6 and a light emitting element EL. In some embodiments, the pixel 100 may further include a seventh transistor T7. For example, the seventh transistor T7 may be omitted.

The first transistor T1 may generate a driving current based on a voltage stored in the first capacitor CST and a voltage stored in the second capacitor CTH. The first transistor T1 may be referred to as a driving transistor for generating the driving current. Further, the first transistor T1 may have a double gate structure including a first gate (e.g., a top gate) and a second gate (e.g., a bottom gate). In an embodiment, the first transistor T1 includes the first gate connected to a first node N1, a first terminal (e.g., a drain) connected to a second node N2, a second terminal (e.g., a source) connected to a third node N3, and the second gate connected to a fourth node N4.

The first capacitor CST may be connected between the first node N1 and the third node N3. The first capacitor CST may be referred to as a storage capacitor for storing a data voltage of a data line DL (or a voltage difference between the data voltage and an initialization voltage VINT). In some embodiments, the first capacitor CST may include a first electrode connected to the first node N1, and a second electrode connected to the third node N3.

The second capacitor CTH may be connected between the fourth node N4 and the third node N3. The second capacitor CTH may be referred to as a threshold voltage capacitor or a compensation capacitor for storing a threshold voltage of the first transistor T1. In some embodiments, the second capacitor CTH may include a first electrode connected to the fourth node N4, and a second electrode connected to the third node N3.

In some embodiments, the first gate of the first transistor T1 may be a top gate located above an active region of the first transistor T1, and the second gate of the first transistor T1 may be a bottom gate located under the active region of the first transistor T1. The first electrode of the first capacitor CST may be connected to the top gate of the first transistor T1. Further, the first electrode of the second capacitor CTH may be connected to the bottom gate of the first transistor T1, or may be formed integrally with the bottom gate of the first transistor T1.

For example, as illustrated in FIG. 2, a first electrode layer ML1 may be formed on a substrate SUB of a display panel. The first electrode layer ML1 may serve as the second electrode of the first capacitor CST and the second electrode of the second capacitor CTH. Further, a first insulating layer IL1 may be formed on the first electrode layer ML1. A bottom electrode layer BML and a second electrode layer ML2 may be formed on the first insulating layer IL1. The bottom electrode layer BML may serve as the second gate (or the bottom gate) of the first transistor T1 and the first electrode of the second capacitor CTH, and the second electrode layer ML2 may serve as the first electrode of the first capacitor CST. Thus, the first electrode layer ML1 and the second electrode layer ML2 may form the first capacitor CST, and the first electrode layer ML1 and the bottom electrode layer BML may form the second capacitor CTH. A second insulating layer IL2 may be formed on the bottom electrode layer BML and the second electrode layer ML2. A first source/drain region SD1, an active region ACT and a second source/drain region SD2 may be formed on the second insulating layer IL2. In some embodiments, the active region ACT may include an oxide semiconductor, and the first transistor T1 may be an oxide transistor. In other embodiments, the active region ACT may include an organic semiconductor or amorphous silicon. Further, the first and second source/drain regions SD1 and SD2 may be n+ doped regions (e.g., doped with impurities), and may serve as the source and the drain of the first transistor T1, respectively. A gate insulating layer GI may be formed on the active region ACT, and a top electrode layer TML may be formed on the gate insulating layer GI. The top electrode layer TML may serve as the first gate (or the top gate) of the first transistor T1. Thus, the upper electrode layer TML, the first source/drain region SD1, the active region ACT, the second source/drain region SD2 and the bottom electrode layer BML may form the first transistor T1. A third insulating layer IL3 may be formed on the upper electrode layer TML. For example, the first electrode layer ML1, the second electrode layer ML2, the bottom electrode layer BML and the upper electrode layer TML may include a metal material, such as molybdenum or titanium, but are not limited thereto. In an embodiment, the first electrode layer ML1, the second electrode layer ML2, the bottom electrode layer BML and the upper electrode layer TML are entirely the metal material. Further, the first insulating layer IL1, the second insulating layer IL2, the third insulating layer IL3 and the gate insulating layer GI may include silicon oxide or silicon nitride, but are not limited thereto. In an embodiment, the first insulating layer IL1, the second insulating layer IL2, the third insulating layer IL3 and the gate insulating layer GI are entirely silicon oxide or silicon nitride.

Referring again to FIG. 1, the second transistor T2 may apply the data voltage of the data line DL to the first node N1 in response to a first scan signal SC1. The first scan signal SC1 may be a write signal GW, and the second transistor T2 may be referred to as a scan transistor or a switching transistor for transferring the data voltage. In some embodiments, the second transistor T2 may include a gate which receives the first scan signal SC1, a first terminal connected to the data line DL which transfers the data voltage, and a second terminal connected to the first node N1.

The third transistor T3 may apply a reference voltage VREF to the first node N1 in response to a second scan signal SC2. The second scan signal SC2 may be a reset signal GR, and the third transistor T3 may be referred to as a reset transistor for applying the reference voltage VREF to the first node N1. In some embodiments, the third transistor T3 has a gate which receives the second scan signal SC2, a first terminal connected to a line which transfers the reference voltage VREF, and a second terminal connected to the first node N1.

The fourth transistor T4 may apply the initialization voltage VINT to the third node N3 in response to a third scan signal SC3. The third scan signal SC3 may be a bypass signal GB, and the fourth transistor T4 may be referred to as an anode initialization transistor for initializing an anode of the light emitting element EL. In some embodiments, the fourth transistor T4 may include a gate which receives the third scan signal SC3, a first terminal connected to a line which transfers the initialization voltage VINT, and a second terminal connected to the third node N3.

The fifth transistor T5 may connect a line which transfers a first power supply voltage ELVDD (e.g., a high power supply voltage) to the second node N2 in response to an emission signal EM. The fifth transistor T5 may be referred to as an emission transistor for forming a path of the driving current from the line which transfers the first power supply voltage ELVDD to a line which transfers a second power supply voltage ELVSS (e.g., a low power supply voltage). A magnitude of the first power supply voltage ELVDD may be higher than the second power supply voltage ELVSS. In some embodiments, the fifth transistor T5 may include a gate which receives the emission signal EM, a first terminal connected to the line which transfers the first power supply voltage ELVDD, and a second terminal connected to the second node N2.

The sixth transistor T6 may connect the fourth node N4 to the second node N2 in response to the second scan signal SC2. When the fourth node N4 is connected to the second node N2, the second gate of the first transistor T1 may be connected to the first terminal (e.g., the drain) of the first transistor T1, and thus the first transistor T1 may be diode-connected. Accordingly, the sixth transistor T6 may be referred to as a compensation transistor for performing a threshold voltage compensation operation for the first transistor T1 by diode-connecting the first transistor T1. In some embodiments, the sixth transistor T6 may include a gate which receives the second scan signal SC2, a first terminal connected to the fourth node N4, and a second terminal connected to the second node N2.

The seventh transistor T7 may apply the first power supply voltage ELVDD to the fourth node N4 in response to a fourth scan signal SC4. The fourth scan signal SC4 may be an initialization signal GI, and the seventh transistor T7 may be referred to as an initialization transistor for initializing the fourth node N4. In some embodiments, the seventh transistor T7 may include a gate which receives the fourth scan signal SC4, a first terminal connected to the line which transfers the first power supply voltage ELVDD, and a second terminal connected to the fourth node N4.

The light emitting element EL may emit light based on the driving current generated by the first transistor T1. In some embodiments, the light emitting element EL may be an organic light emitting diode OLED, but is not limited thereto. In other embodiments, the light emitting element EL may be a nano light emitting diode (NED), a quantum dot (QD) light emitting diode, a micro light emitting diode or an inorganic light emitting diode. In some embodiments, the light emitting element EL may include an anode connected to the third node N3, and a cathode connected to the line which transfers the second power supply voltage ELVSS.

In some embodiments, as illustrated in FIG. 1, the first through seventh transistors T1 through T7 may be, but are not limited to, n-type metal oxide semiconductor (NMOS) transistors. Further, in some embodiments, the first through seventh transistors T1 through T7 may be implemented as oxide transistors having higher mobility than amorphous silicon transistors. In other embodiments, the first transistor T1 may be an NMOS transistor, and at least one of the second through seventh transistors T2 through T7 may be a p-type metal oxide semiconductor (PMOS) transistor.

The pixel 100 of the display device according to an embodiment, performs a threshold voltage compensation operation in a diode connection manner. That is, in a compensation period, the third transistor T3 may apply the reference voltage VREF to the first node N1, and the fourth transistor T4 may apply the initialization voltage VINT higher than the reference voltage VREF to the third node N3. Thus, in the compensation period, a negative gate-source voltage may be applied to the first transistor T1, and the threshold voltage of the first transistor T1 may be shifted in a positive direction. Further, the sixth transistor T6 may connect the fourth node N4 to the second node N2 to diode-connect the first transistor T1. Accordingly, the first transistor T1 may operate as a diode in which a current flows from the second gate connected to the fourth node N4 to the second terminal connected to the third node N3, a voltage of the fourth node N4 may be changed to a sum of the initialization voltage VINT and the threshold voltage of the first transistor T1, and the second capacitor CTH may store the threshold voltage of the first transistor T1 in the diode connection manner. As described above, since the threshold voltage compensation operation is performed in the diode connection manner in the pixel 100 according to an embodiment, a compensation ability of the pixel 100 according to an embodiment may be increased compared with a pixel in which a threshold voltage compensation operation is performed in a source follower manner.

Further, in the pixel 100 according to an embodiment, the threshold voltage of the first transistor T1 may be stored in the second capacitor CTH, which is different from the first capacitor CST for storing the data voltage, and the second capacitor CTH may maintain the threshold voltage of the first transistor T1 for a plurality of frame periods. Thus, the threshold voltage compensation operation may be performed only in a portion (e.g., a compensation frame period) of the plurality of frame periods, and need not be performed in the remaining portion (e.g., a non-compensation frame period) of the plurality of frame periods. In this case, in a frame period (e.g., the non-compensation frame period) in which the threshold voltage compensation operation is not performed, the second and fourth scan signals SC2 and SC4 do not toggle, and thus power consumption of a display device including the pixel 100 according to an embodiment may be reduced.

In addition, in a display device including a pixel having a capacitor directly connected to the line which transfers the first power supply voltage ELVDD, a horizontal crosstalk may occur due to variation in the first power supply voltage ELVDD. However, since the pixel 100 according to an embodiment does not include a capacitor directly connected to the line which transfers the first power supply voltage ELVDD, the horizontal crosstalk should not occur in the display device including the pixel 100 according to an embodiment.

Figure 3:
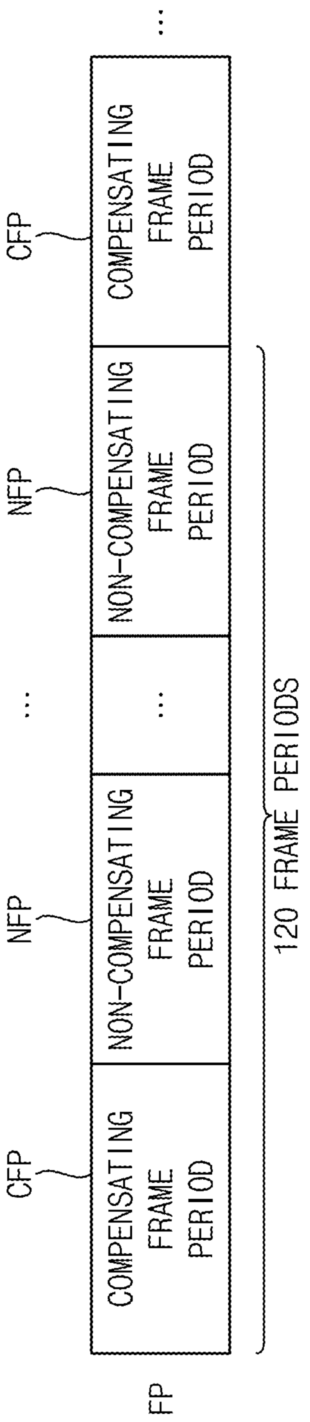
FIG. 3 is a diagram illustrating an example of a plurality of frame periods for a display device according to an embodiment.

FIG. 3 is a diagram illustrating an example of a plurality of frame periods for a display device according to an embodiment.

Referring to FIGS. 1 and 3, a plurality of frame periods FP for a display device including a pixel 100 include a compensation frame period CFP and a non-compensation frame period NFP. For example, the compensation frame period CFP may occur once during a certain period including several frame periods and the non-compensation frame period NFP may occur multiple times during the certain period. In the compensation frame period CFP, each pixel 100 may perform a threshold voltage compensation operation that stores a threshold voltage of a first transistor T1 in a second capacitor CTH in a diode connection manner by applying a negative gate-source voltage to the first transistor T1 and by diode-connecting the first transistor T1.

Figure 9:
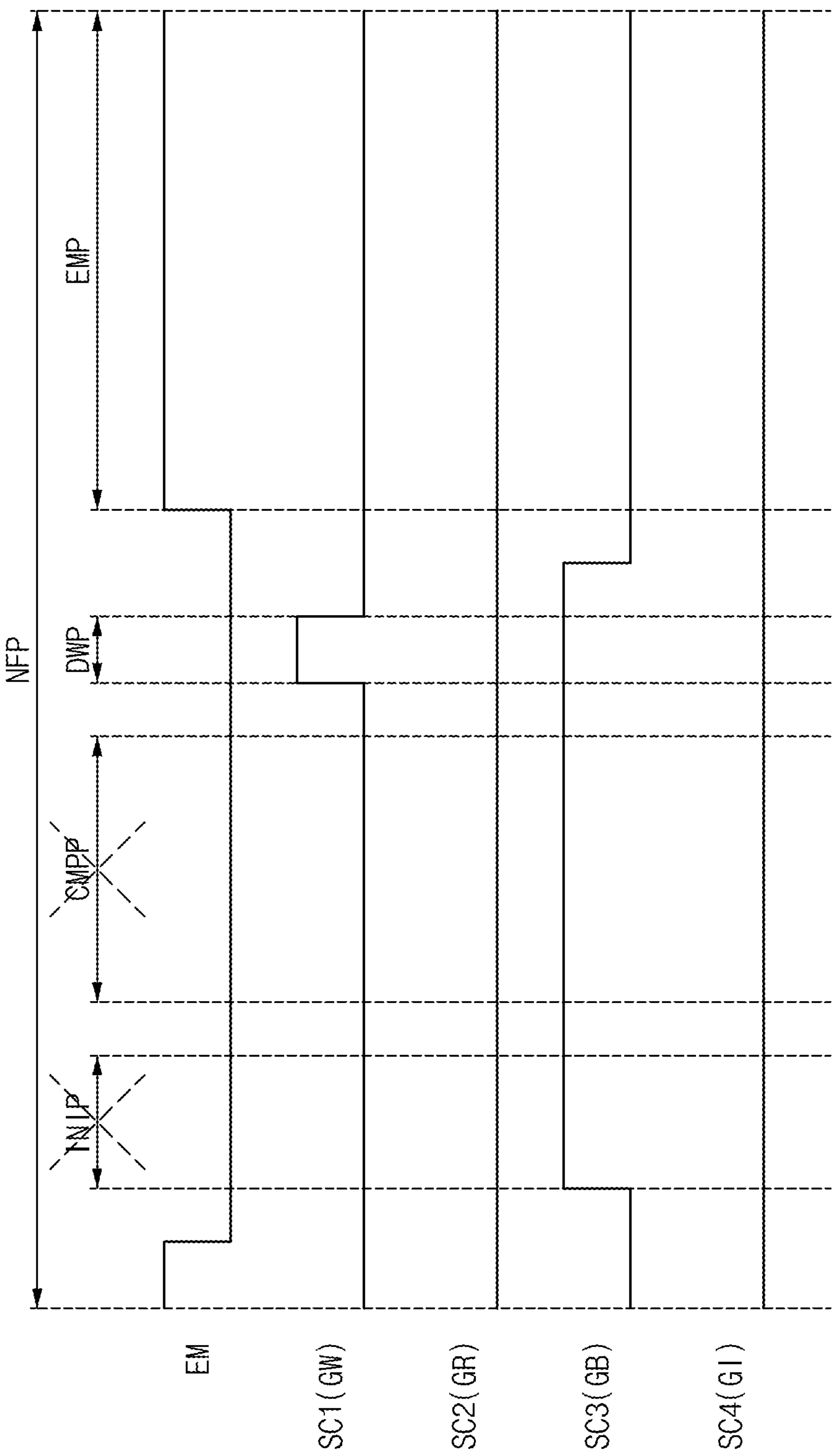
FIG. 9 is a timing diagram for describing an example of an operation of a pixel in a non-compensation frame period.

However, in the non-compensation frame period NFP, each pixel 100 does not perform the threshold voltage compensation operation, and the second capacitor CTH may maintain the threshold voltage of the first transistor T1 which was stored during a previous compensation frame period CFP. Thus, in the non-compensation frame period NFP, as illustrated in FIG. 9, second and fourth scan signals SC2 and SC4 do not toggle, and are maintained as an off-level (e.g., a low level). Accordingly, power consumption of a scan driver that outputs the second and fourth scan signals SC2 and SC4 may be reduced, and power consumption of the display device according to an embodiment may be reduced.

As described above, in the display device according to an embodiment, the threshold voltage compensation operation is performed only in a portion (i.e., the compensation frame period CFP) of the plurality of frame periods FP. For example, as illustrated in FIG. 3, the plurality of frame periods FP for the display device may periodically and repeatedly include one compensation frame period CFP and one hundred and nineteen non-compensation frame periods NFP, but is not limited thereto. Accordingly, the power consumption of the display device according to an embodiment may be reduced.

Figure 4:
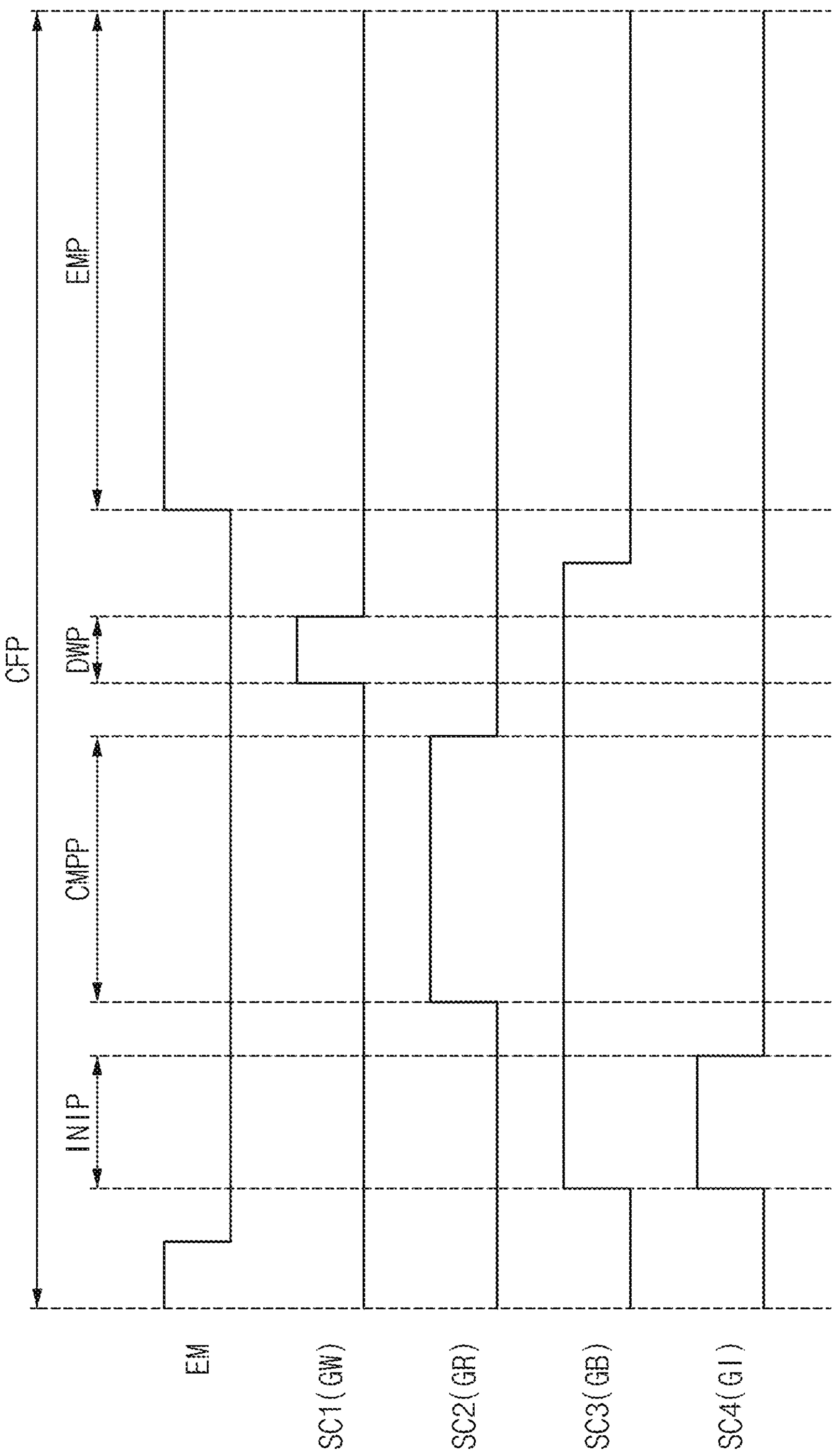
FIG. 4 is a timing diagram for describing an example of an operation of a pixel in a compensation frame period.
Figure 5:
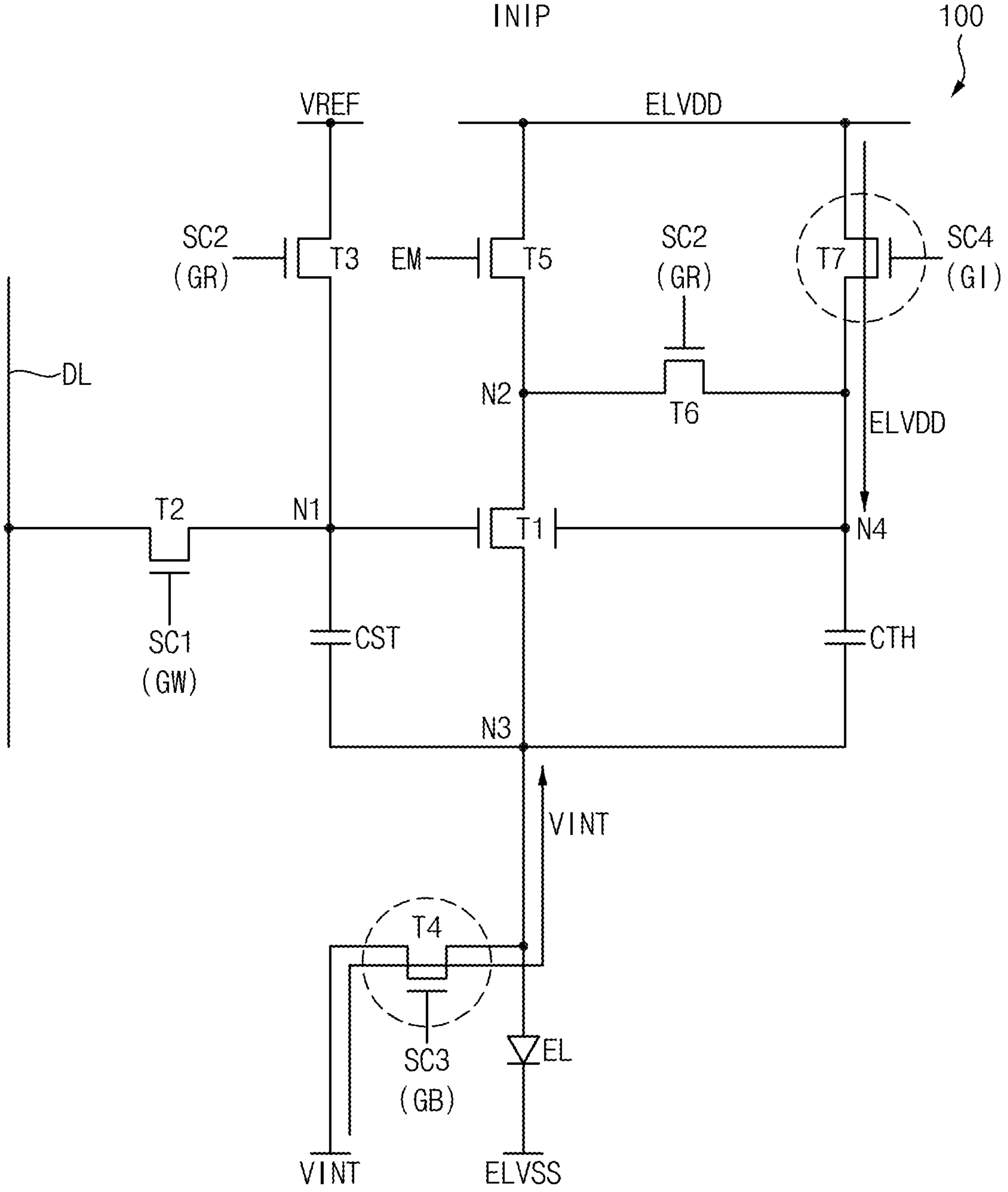
FIG. 5 is a circuit diagram for describing an example of an operation of a pixel in an initialization period.
Figure 6:
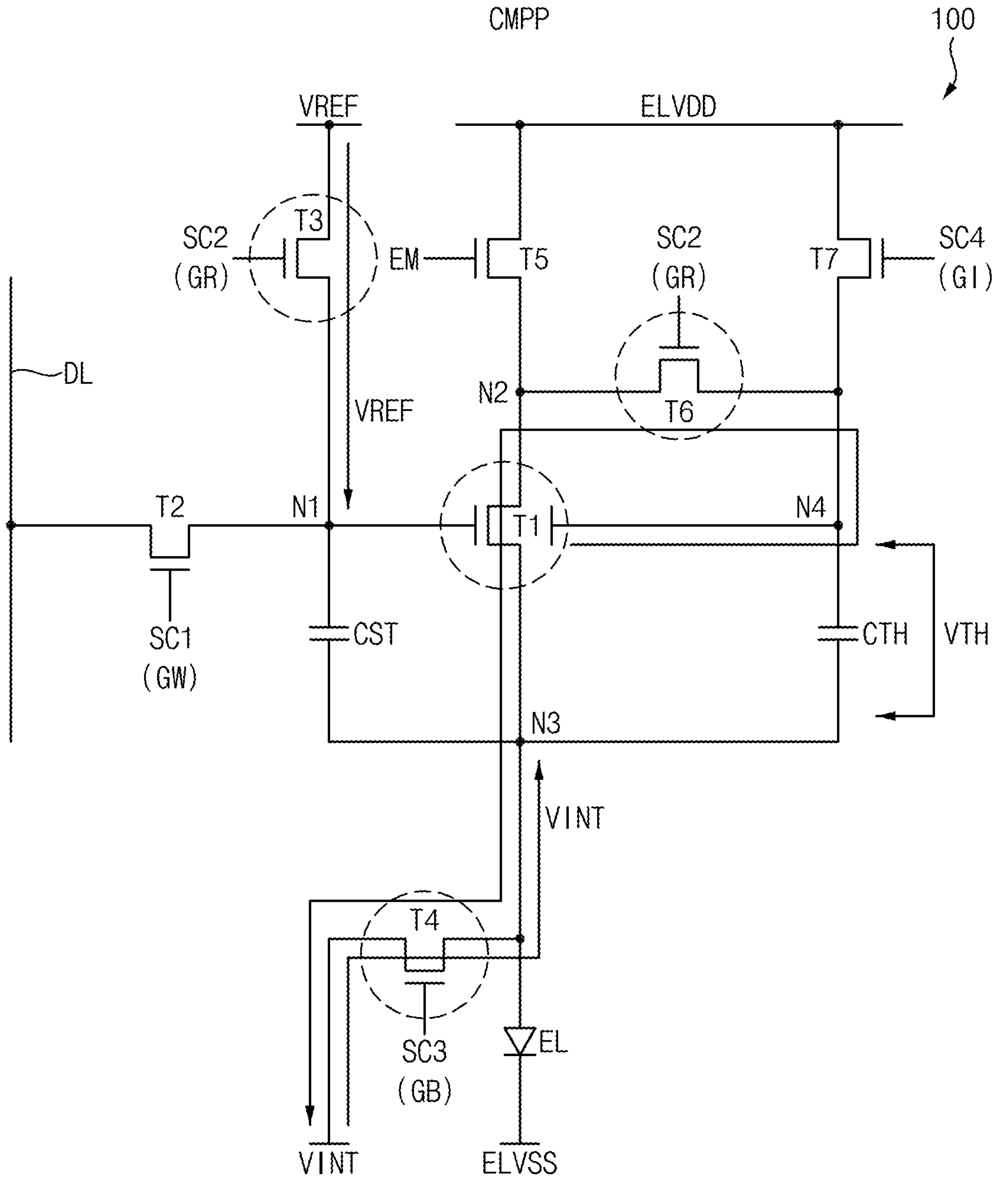
FIG. 6 is a circuit diagram for describing an example of an operation of a pixel in a compensation period.
Figure 7:
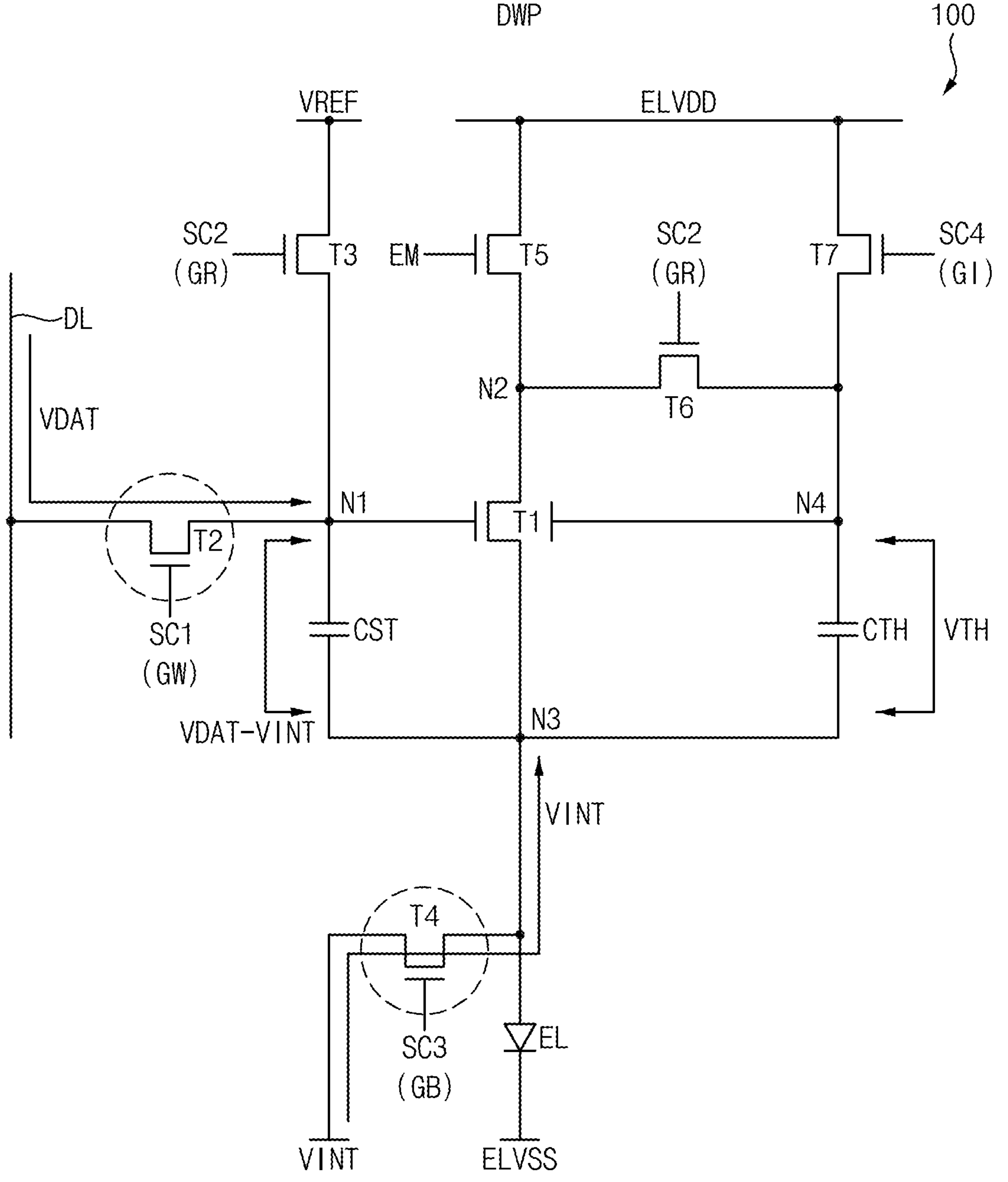
FIG. 7 is a circuit diagram for describing an example of an operation of a pixel in a writing period.
Figure 8:
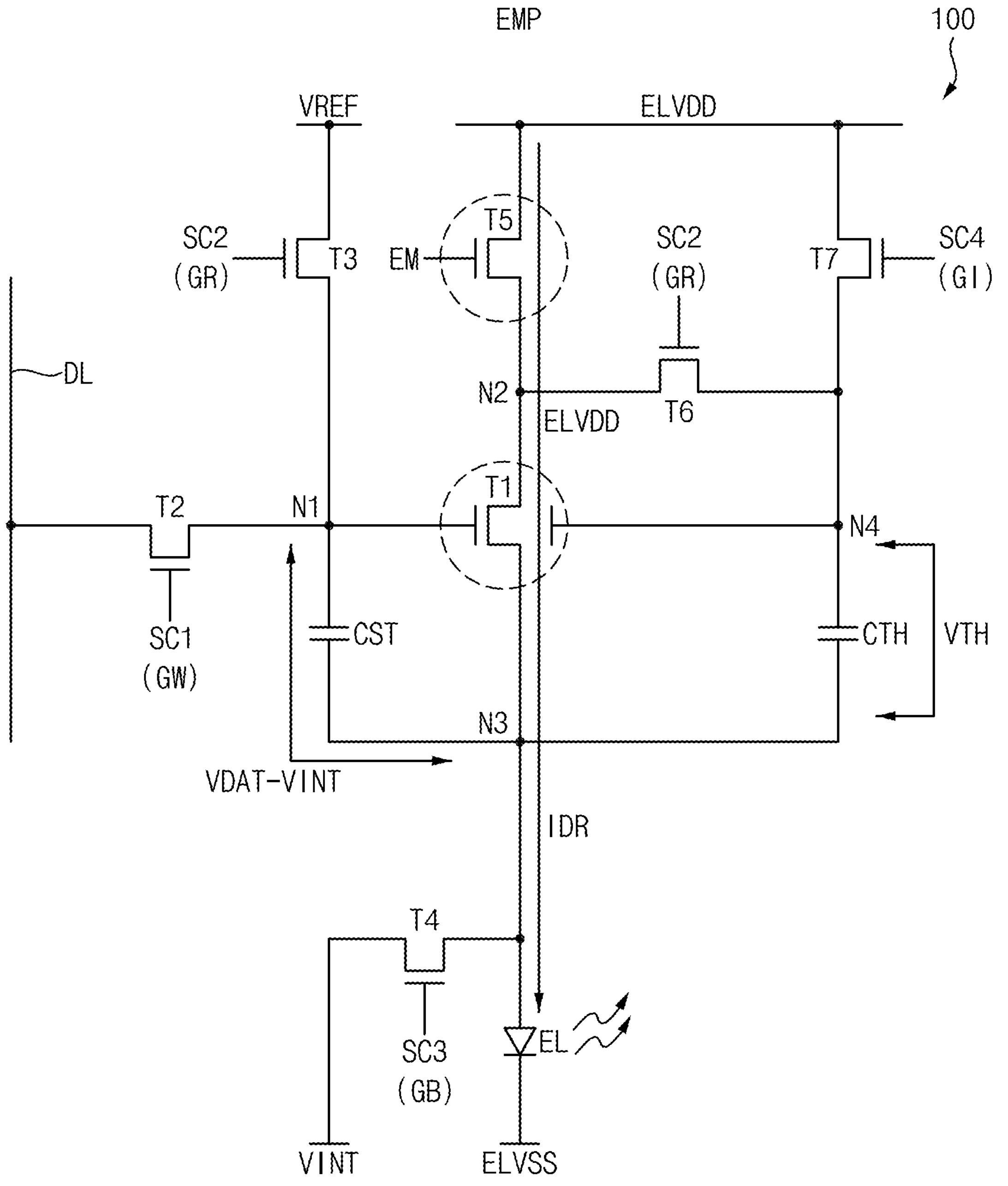
FIG. 8 is a circuit diagram for describing an example of an operation of a pixel in an emission period.

FIG. 4 is a timing diagram for describing an example of an operation of a pixel in a compensation frame period, FIG. 5 is a circuit diagram for describing an example of an operation of a pixel in an initialization period, FIG. 6 is a circuit diagram for describing an example of an operation of a pixel in a compensation period, FIG. 7 is a circuit diagram for describing an example of an operation of a pixel in a writing period, and FIG. 8 is a circuit diagram for describing an example of an operation of a pixel in an emission period.

Referring to FIGS. 1 and 4, a non-compensation frame period NFP for a display device including a pixel 100 includes an initialization period INIP, a compensation period CMPP, a writing period DWP and an emission period EMP.

In the initialization period INIP, a third node N3 and a fourth node N4 may be initialized. A third scan signal SC3 and a fourth scan signal SC4 have an on-level (e.g., a high level), and a first scan signal SC1, a second scan signal SC2 and an emission signal EM have an off-level (e.g., a low level). Thus, as illustrated in FIG. 5, a fourth transistor T4 may be turned on in response to the third scan signal SC3 having the on-level, and may apply an initialization voltage VINT to the third node N3. Further, a seventh transistor T7 may be turned on in response to the fourth scan signal SC4 having the on-level, and may apply a first power supply voltage ELVDD to the fourth node N4. Thus, the third node N3 may be initialized based on the initialization voltage VINT. That is, an anode of a light emitting element EL may be initialized based on the initialization voltage VINT, and a second electrode of a second capacitor CTH may be initialized based on the initialization voltage VINT. Further, the fourth node N4 may be initialized based on the first power supply voltage ELVDD. That is, a first electrode of the second capacitor CTH may be initialized based on the first power supply voltage ELVDD.

In the compensation period CMPP, a threshold voltage compensation operation is performed to store a threshold voltage VTH of a first transistor T1 in the second capacitor CTH. The second scan signal SC2 and the third scan signal SC3 have the on-level, and the first scan signal SC1, the fourth scan signal SC4 and the emission signal EM have the off-level. Thus, as illustrated in FIG. 6, a third transistor T3 may be turned on in response to the second scan signal SC2 having the on-level, and may apply a reference voltage VREF to a first node N1. The fourth transistor T4 may be turned on in response to the third scan signal SC3 having the on-level, and may apply the initialization voltage VINT to the third node N3. In an embodiment, the initialization voltage VINT is higher than the reference voltage VREF. For example, the initialization voltage VINT may be, but is not limited to, about 3V, and the reference voltage VREF may be, but is not limited to, about 1.5V. Thus, in the compensation period CMPP, a negative gate-source voltage may be applied to the first transistor T1, and the threshold voltage VTH of the first transistor T1 may be shifted in a positive direction. Further, the sixth transistor T6 may be turned on in response to the second scan signal SC2 having the on-level, and may connect the fourth node N4 to a second node N2. Thus, a second gate of the first transistor T1 may be connected to a first terminal (e.g., a drain) of the first transistor T1. In other words, the first transistor T1 may be diode-connected. In the compensation period CMPP, since the threshold voltage VTH of the first transistor T1 is shifted in the positive direction, and the first transistor T1 is diode-connected, the second capacitor CTH may store the threshold voltage VTH of the first transistor T1 in a diode connection manner.

In the writing period DWP, a voltage difference between a data voltage VDAT and the initialization voltage VINT may be stored in a first capacitor CST. In the write period DWP, the first scan signal SC1 and the third scan signal SC3 have the on-level, and the second scan signal SC2, the fourth scan signal SC4 and the emission signal EM have the off-level. Thus, as illustrated in FIG. 7, a second transistor T2 may be turned on in response to the first scan signal SC1 having the on-level, and may apply the data voltage VDAT of the date line DL to the first node N1. The fourth transistor T4 may be turned on in response to the third scan signal SC3 having the on-level, and may apply the initialization voltage VINT to the third node N3. Thus, the first capacitor CST may store the voltage difference VDAT−VINT between the data voltage VDAT and the initialization voltage VINT.

In the emission period EMP, the light emitting element EL may emit light. In the emission period EMP, the emission signal EM has the on-level, and the first scan signal SC1, the second scan signal SC2, the third scan signal SC3 and the fourth scan signal SC4 have the off-level. Thus, as illustrated in FIG. 8, the fifth transistor T5 may be turned on in response to the emission signal EM having the on-level, and may connect a line which transfers the first power supply voltage ELVDD and the second node N2. The first transistor T1 may generate a driving current IDR based on the voltage difference VDAT−VINT between the data voltage VDAT and the initialization voltage VINT stored in the first capacitor CST, and the threshold voltage VTH of the first transistor T1 stored in the second capacitor CTH. Thus, the light emitting element EL may emit light based on the driving current IDR generated by the first transistor T1.

FIG. 9 is a timing diagram for describing an example of an operation of a pixel in a non-compensation frame period.

Referring to FIGS. 1 and 9, a non-compensation frame period NFP for a display device including a pixel 100 includes a writing period DWP in which a voltage difference between a data voltage VDAT and an initialization voltage VINT is stored in a first capacitor CST, and an emission period EMP in which a light emitting element EL emits light, but does not include the initialization period INIP and the compensation period CMPP illustrated in FIG. 4. That is, in the non-compensation frame period NFP of FIG. 9, the second capacitor CTH is not initialized, and the second capacitor CTH may maintain a threshold voltage of a first transistor T1 stored during a previous compensation frame period. Thus, although a threshold voltage compensation operation is not performed in the non-compensation frame period NFP, the pixel 100 may emit light with a desired luminance. Further, in the non-compensation frame period NFP, second and fourth scan signals SC2 and SC4 do not toggle, and are maintained as an off-level (e.g., a low level). Accordingly, power consumption of a scan driver that outputs the second and fourth scan signals SC2 and SC4 may be reduced, and power consumption of the display device according to an embodiment may be reduced.

Figure 10:
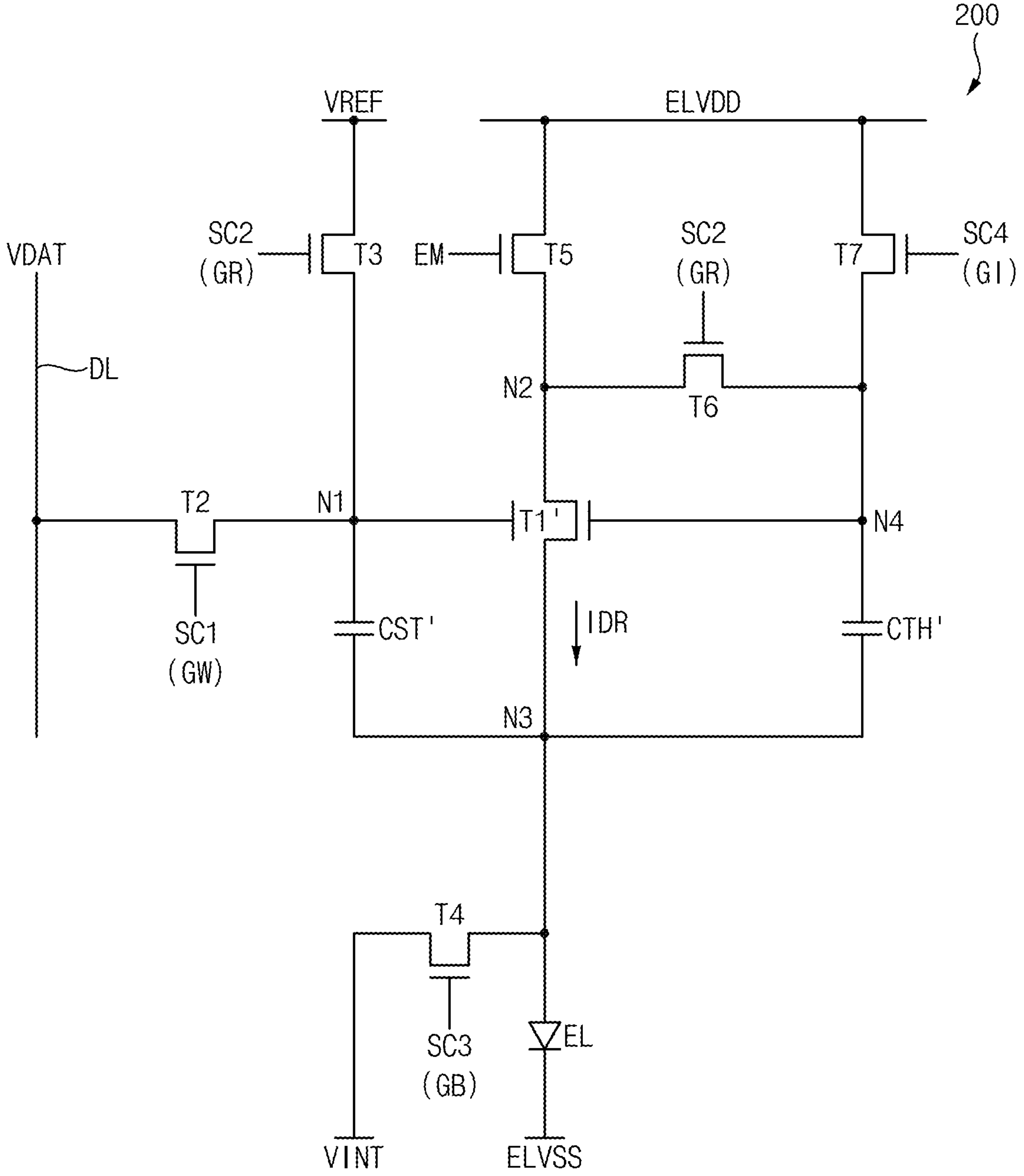
FIG. 10 is a circuit diagram illustrating a pixel of a display device according to an embodiment.
Figure 11:
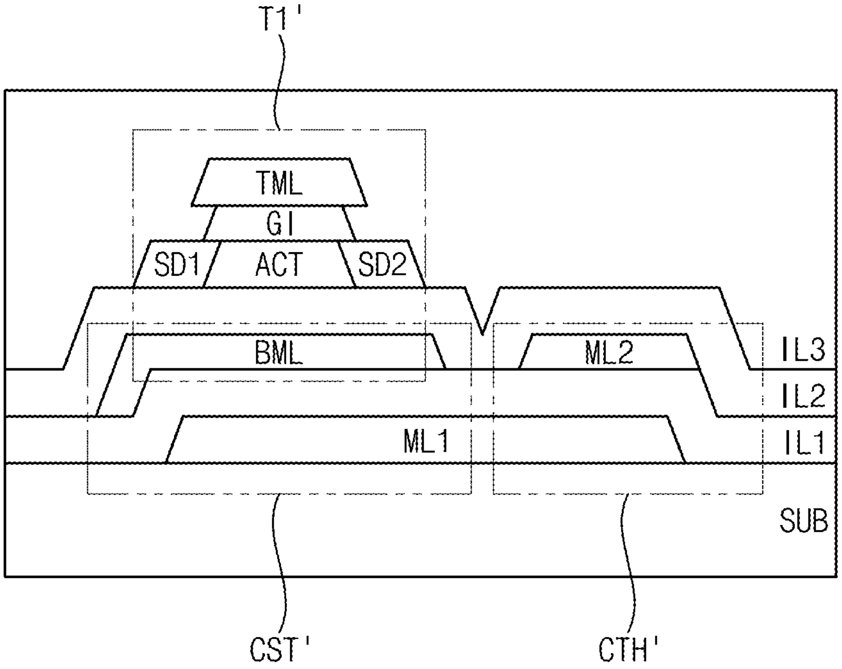
FIG. 11 is a cross-sectional diagram illustrating an example of a portion of a pixel of FIG. 10.

FIG. 10 is a circuit diagram illustrating a pixel of a display device according to embodiments, and FIG. 11 is a cross-sectional diagram illustrating an example of a portion of a pixel of FIG. 10.

Referring to FIG. 10, a pixel 200 according to an embodiment includes a first transistor T1', a first capacitor CST', a second capacitor CTH', a second transistor T2, a third transistor T3, a fourth transistor T4, a fifth transistor T5, a sixth transistor T6, a seventh transistor T7 and a light emitting element EL. The pixel 200 of FIG. 10 has substantially the same configuration and substantially the same operation as a pixel 100 of FIG. 1, except that a first gate of the first transistor T1' connected to a first node N1 is a bottom gate located under an active region, and a second gate of the first transistor T1' connected to a fourth node N4 is a top gate located above the active region. In a case where the bottom gate of the first transistor T1' is connected to the first node N1, and the top gate of the first transistor T1' is connected to the fourth node N4, a threshold voltage compensation operation that stores a threshold voltage of the first transistor T1' in the second capacitor CTH' may be performed more efficiently.

For example, as illustrated in FIG. 11, the first transistor T1' may include a top electrode layer TML, a first source/drain region SD1, an active region ACT, a second source/drain region SD2 and a bottom electrode layer BML. The top electrode layer TML may serve as the top gate of the first transistor T1', and may be connected to the fourth node N4. The bottom electrode layer BML may serve as the bottom gate of the first transistor T1', and may be connected to the first node N1. Further, the bottom electrode layer BML may serve as a first electrode of the first capacitor CST', and the bottom electrode layer BML and a first electrode layer ML1 may form the first capacitor CST'. Further, the first electrode layer ML1 and a second electrode layer ML2 may form the second capacitor CTH'.

Figure 12:
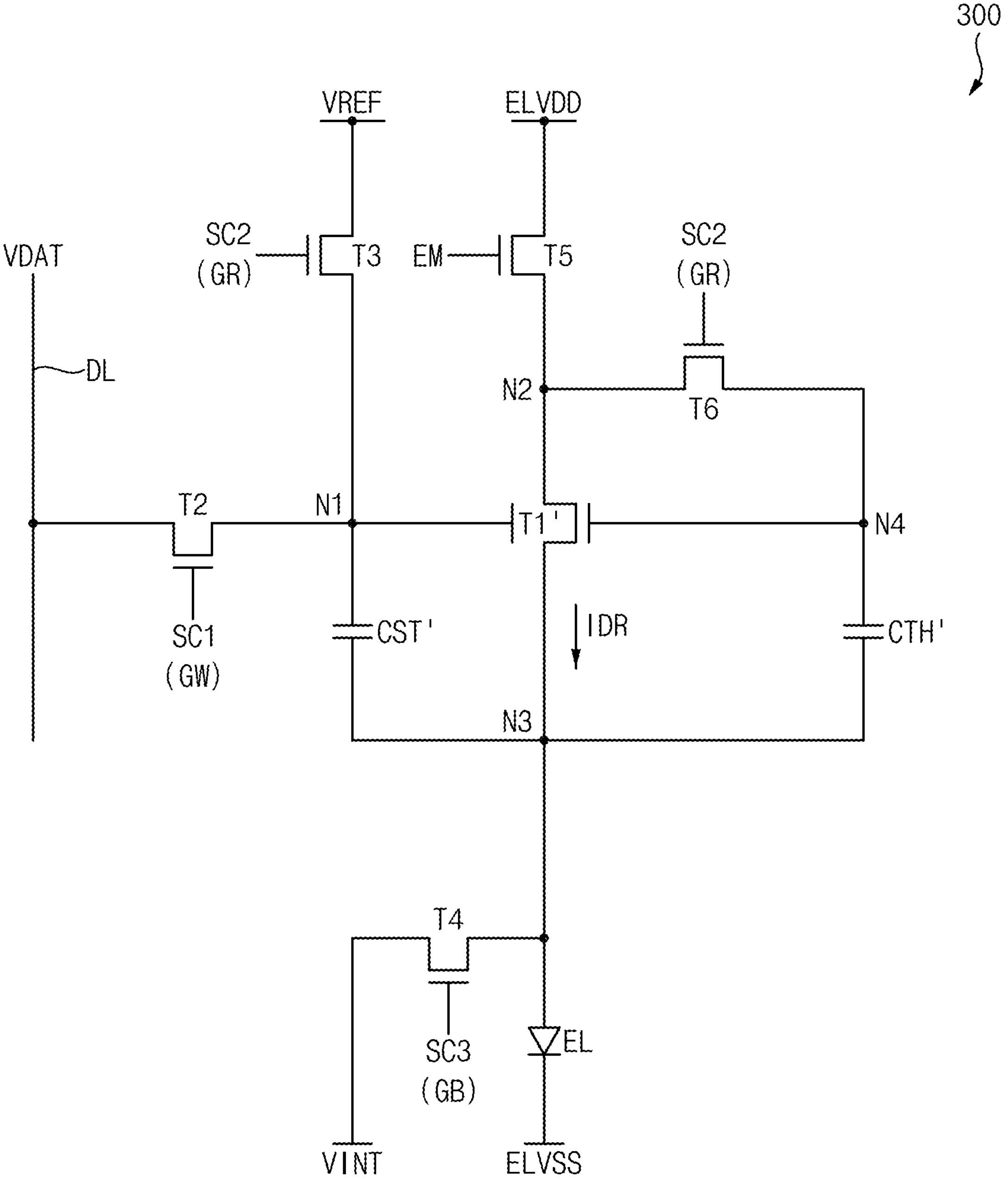
FIG. 12 is a circuit diagram illustrating a pixel of a display device according to embodiments.
Figure 13:
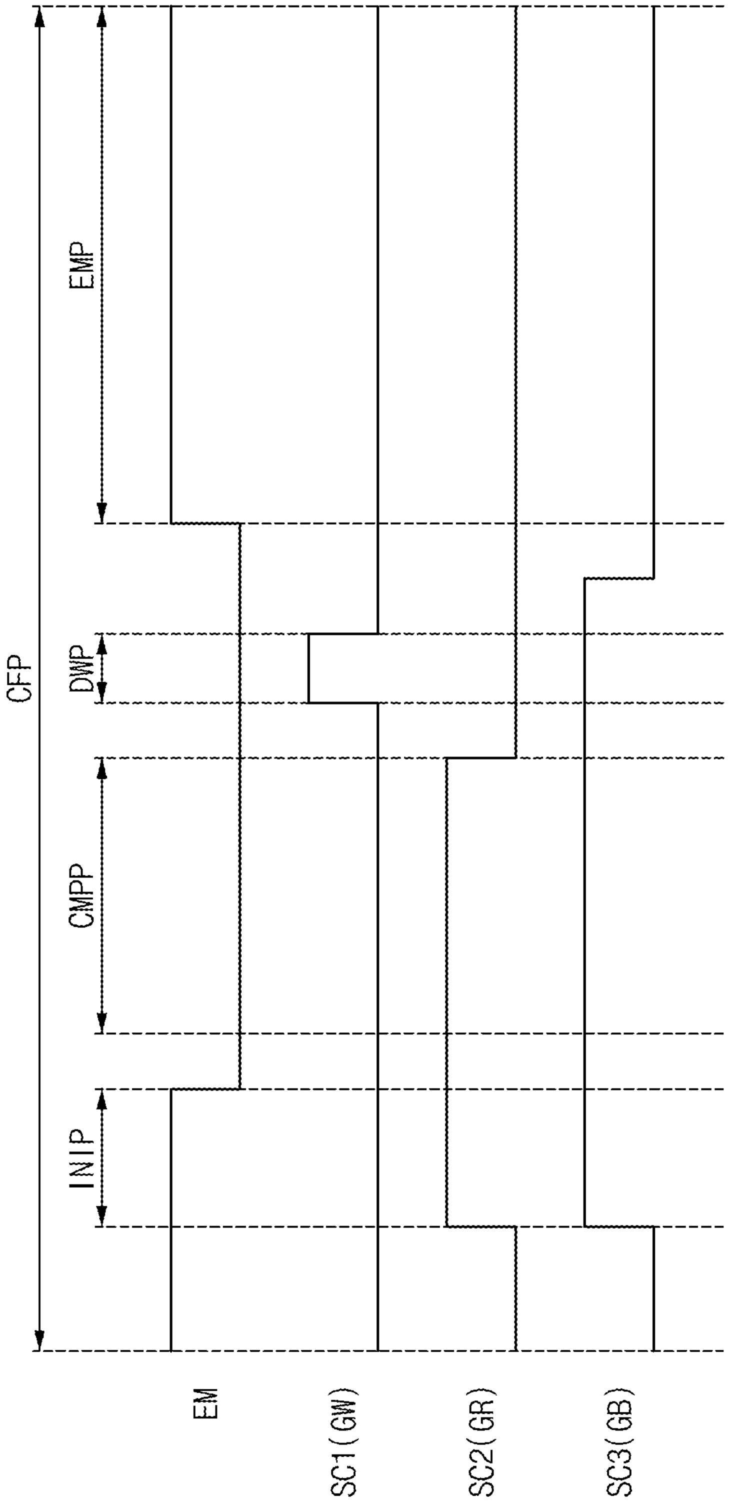
FIG. 13 is a timing diagram for describing an example of an operation of a pixel in a compensation frame period.
Figure 14:
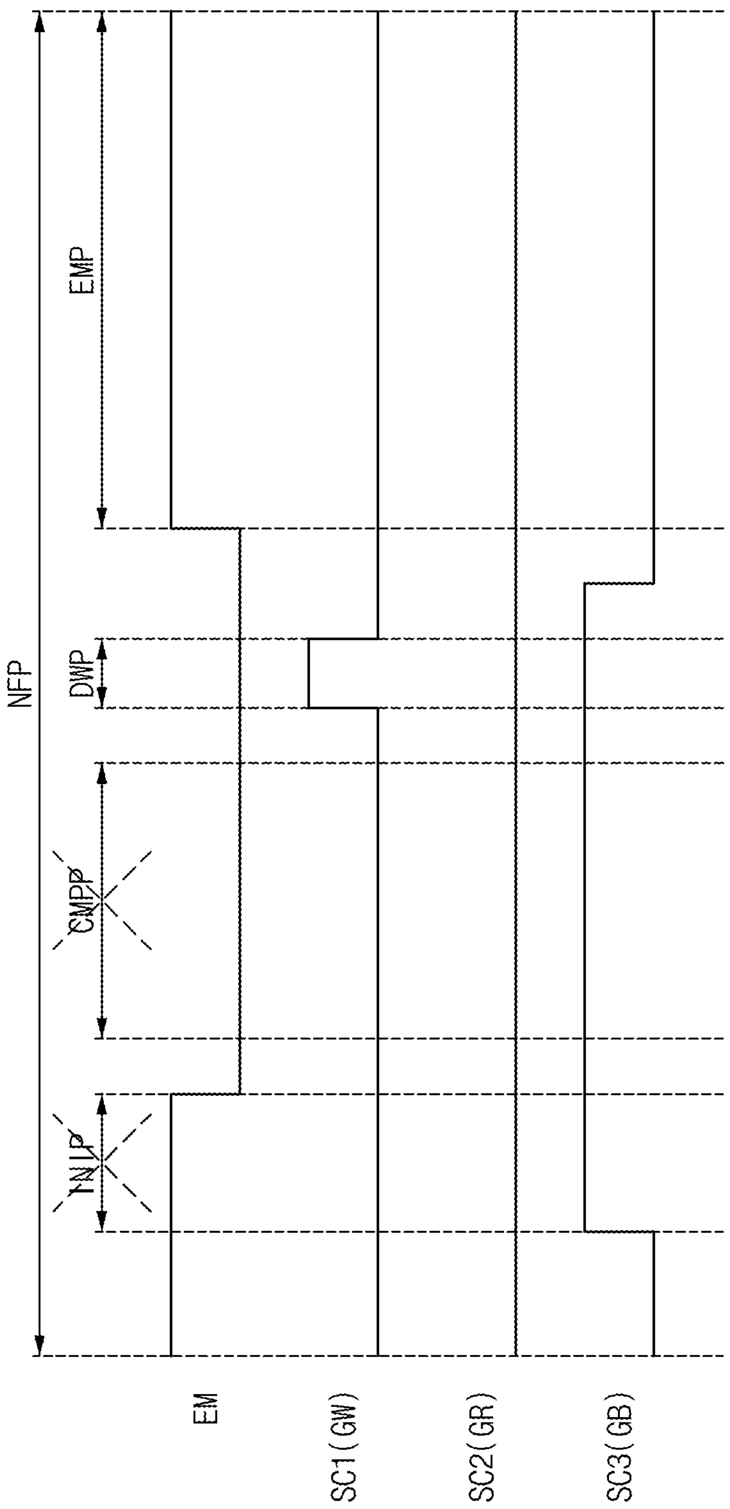
FIG. 14 is a timing diagram for describing an example of an operation of a pixel in a non-compensation frame period.

FIG. 12 is a circuit diagram illustrating a pixel of a display device according to an embodiment, FIG. 13 is a timing diagram for describing an example of an operation of a pixel in a compensation frame period, and FIG. 14 is a timing diagram for describing an example of an operation of a pixel in a non-compensation frame period.

Referring to FIG. 12, a pixel 300 according to an embodiment includes a first transistor T1', a first capacitor CST', a second capacitor CTH', a second transistor T2, a third transistor T3, a fourth transistor T4, a fifth transistor T5, a sixth transistor T6 and a light emitting element EL. The pixel 300 of FIG. 12 has substantially the same configuration and substantially the same operation as a pixel 200 of FIG. 10, except that the pixel 300 does not include the seventh transistor T7 illustrated in FIG. 10.

Further, unlike the pixel 200 of FIG. 10, the pixel 300 does not receive a fourth scan signal SC4. As illustrated in FIG. 13, a compensation frame period CFP includes an initialization period INIP, a compensation period CMPP, a writing period DWP and an emission period EMP. In the initialization period INIP, an emission signal EM, a second scan signal SC2 and a third scan signal SC3 have an on-level (e.g., a high level). The fourth transistor T4 may be turned on in response to the third scan signal SC3 having the on-level, and may apply an initialization voltage VINT to a third node N3. Further, the fifth transistor T5 may be turned on in response to the emission signal EM having the on-level, the sixth transistor T6 may be turned on in response to the second scan signal SC2 having the on-level, and the fifth and sixth transistors T5 and T6 may apply a first power supply voltage ELVDD to a fourth node N4. Accordingly, in the initialization period INIP, the third node N3 and the fourth node N4 may be initialized. Further, the third transistor T3 may be turned on in response to the second scan signal SC2 having the on-level, and may apply the reference voltage VREF to a first node N1. Thus, the first node N1 may be initialized based on the reference voltage VREF. Further, in the compensation period CMPP, a threshold voltage compensation operation may be performed to store a threshold voltage VTH of the first transistor T1' in the second capacitor CTH'. In the writing period DWP, a voltage difference between a data voltage VDAT and the initialization voltage VINT may be stored in the first capacitor CST'. In the emission period EMP, the light emitting element EL may emit light.

Further, as illustrated in FIG. 14, a non-compensation frame period NFP includes the writing period DWP and the emission period EMP, but does not include the initialization period INIP and the compensation period CMPP. Accordingly, power consumption of a scan driver may be reduced, and power consumption of a display device according to embodiments may be reduced.

Figure 15:
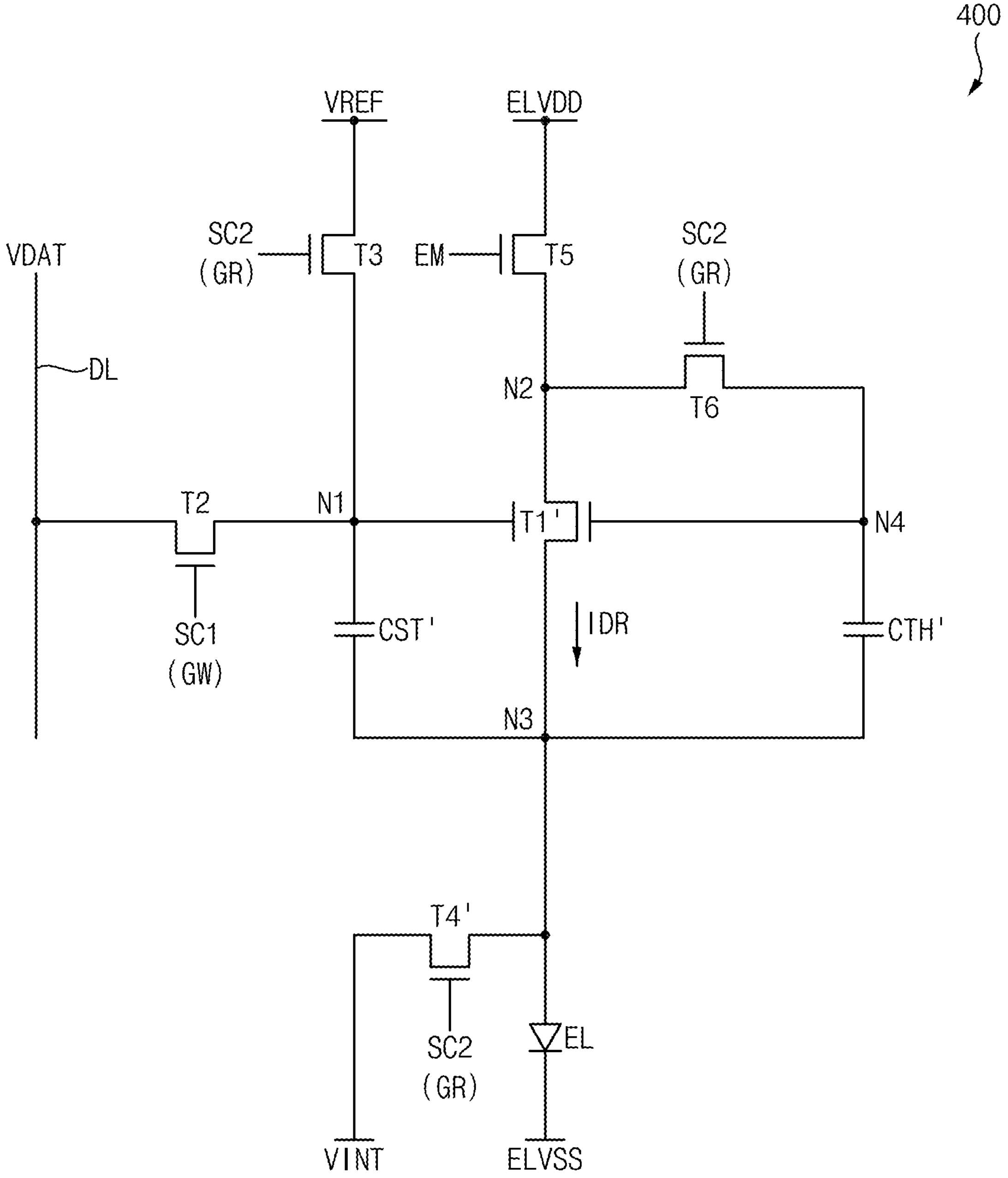
FIG. 15 is a circuit diagram illustrating a pixel of a display device according to embodiments.
Figure 16:
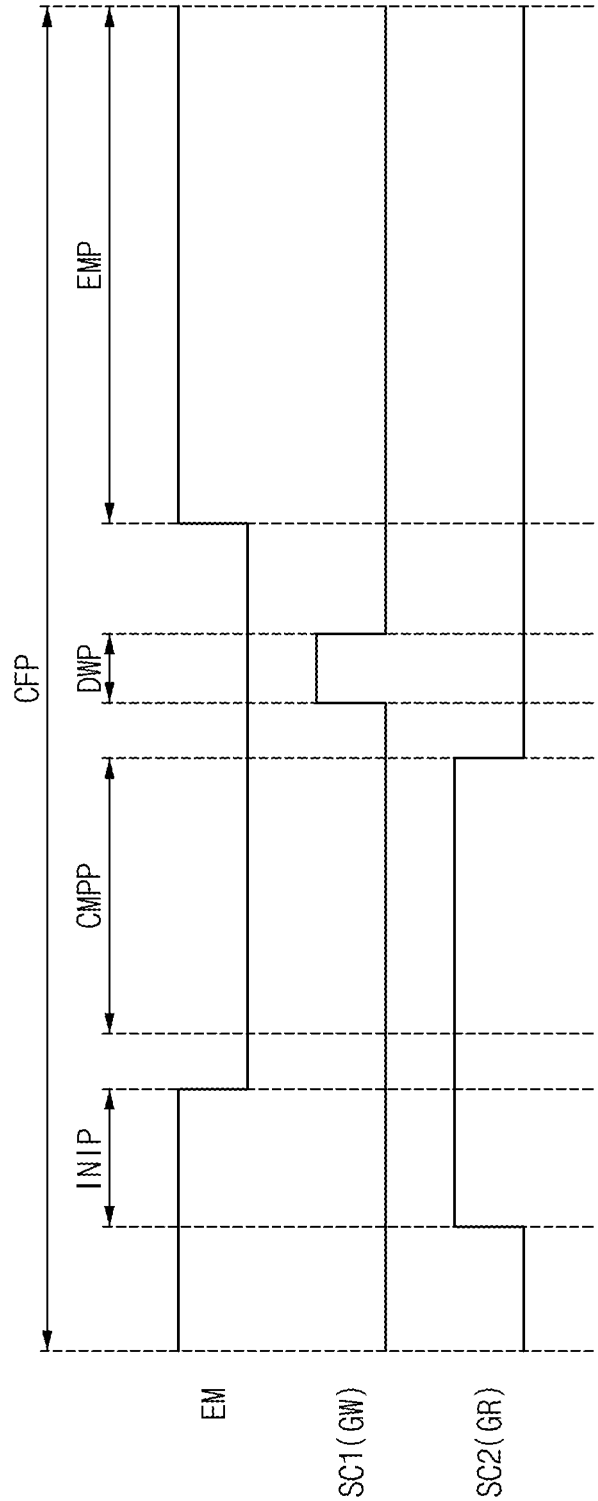
FIG. 16 is a timing diagram for describing an example of an operation of a pixel in a compensation frame period.
Figure 17:
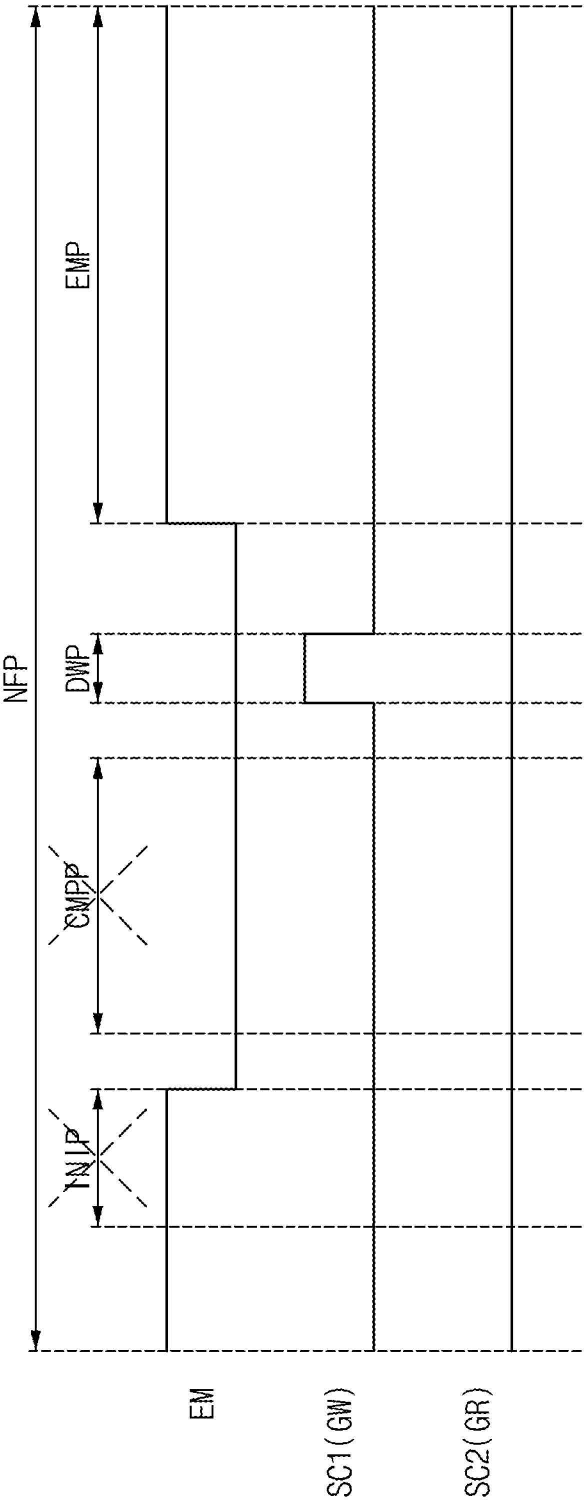
FIG. 17 is a timing diagram for describing an example of an operation of a pixel in a non-compensation frame period.

FIG. 15 is a circuit diagram illustrating a pixel of a display device according to an embodiment, FIG. 16 is a timing diagram for describing an example of an operation of a pixel in a compensation frame period, and FIG. 17 is a timing diagram for describing an example of an operation of a pixel in a non-compensation frame period.

Referring to FIG. 15, a pixel 400 according to an embodiment includes a first transistor T1', a first capacitor CST', a second capacitor CTH', a second transistor T2, a third transistor T3, a fourth transistor T4', a fifth transistor T5, a sixth transistor T6 and a light emitting element EL. The pixel 400 of FIG. 15 has substantially the same configuration and substantially the same operation as a pixel 300 of FIG. 12, except that the fourth transistor T4' receives a second scan signal SC2 instead of a third scan signal SC3.

The pixel 400 receives only a first scan signal SC1, the second scan signal SC2 and an emission signal EM, and does not receive the third scan signal SC3 and a fourth scan signal SC4. For example, as illustrated in FIG. 16, a compensation frame period CFP include an initialization period INIP in which the emission signal EM and the second scan signal SC2 have an on-level, a compensation period CMPP in which the second scan signal SC2 has the on-level, a writing period DWP in which the first scan signal SC1 has the on-level, and an emission period EMP in which the emission signal EM has the on-level. Further, as illustrated in FIG. 17, a non-compensation frame period NFP includes the writing period DWP in which the first scan signal SC1 has the on-level and the emission period EMP in which the emission signal EM has the on-level, but does not include the initialization period INIP and the compensation period CMPP. Thus, a scan driver of a display device including the pixel 400 may have a less complex configuration, and power consumption of the scan driver may be reduced. For example, the pixel 400 may cost less to manufacture than the previously described pixels.

Figure 18:
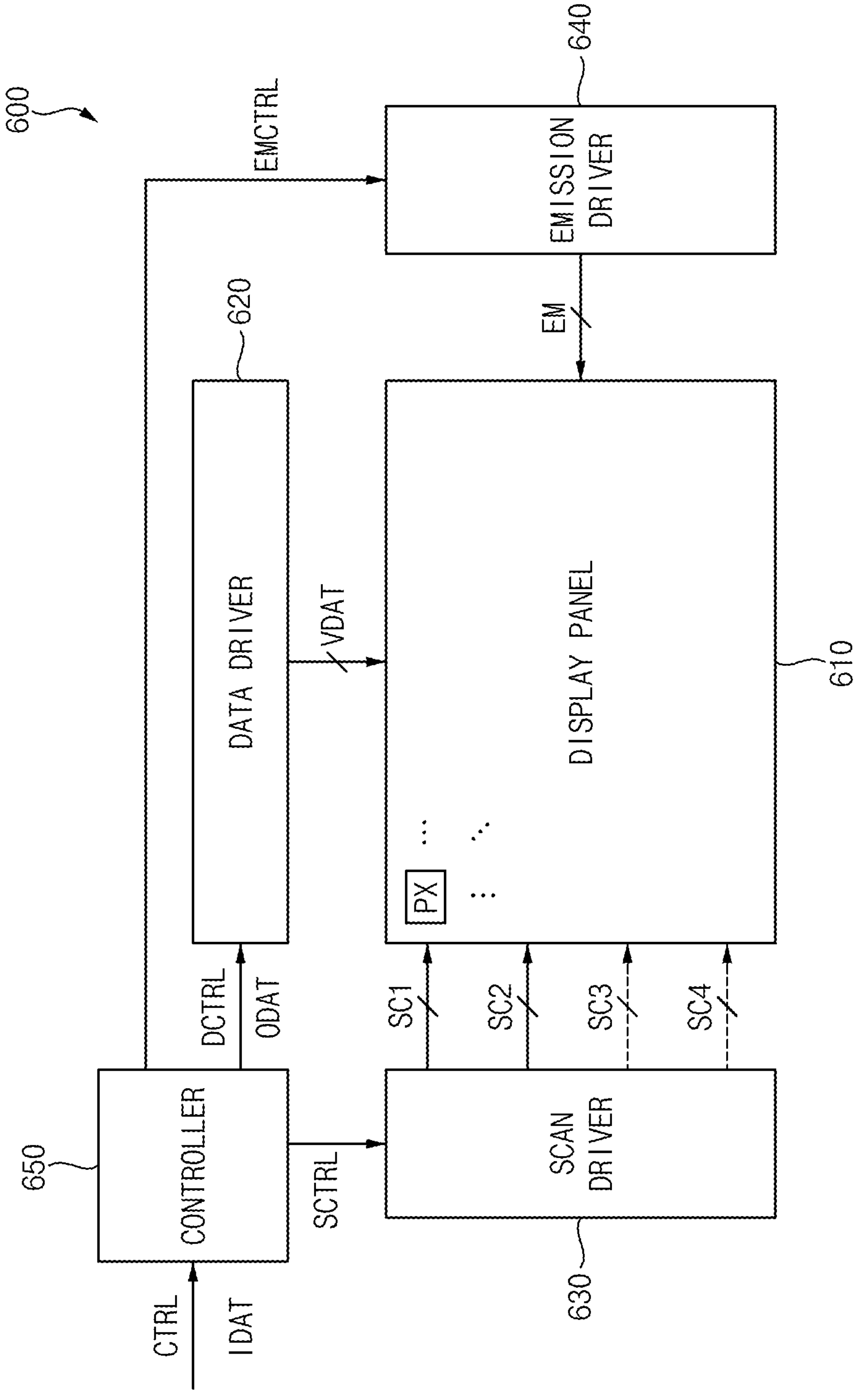
FIG. 18 is a block diagram illustrating a display device according to embodiments.

FIG. 18 is a block diagram illustrating a display device according to an embodiment that may include the pixels described above.

Referring to FIG. 18, a display device 600 according to an embodiment includes a display panel 610, a data driver 620 (e.g., a first driver circuit), a scan driver 630 (e.g., a second driver circuit), an emission driver 640 (e.g., a third driver circuit) and a controller 650 (e.g., a controller circuit).

The display panel 610 may include a plurality of pixels PX. According to an embodiment, each pixel PX of the display panel 610 may be a pixel 100 of FIG. 1, a pixel 200 of FIG. 10, a pixel 300 of FIG. 12, a pixel 400 of FIG. 15, or a pixel having a similar structure. Each pixel PX may include a first transistor having a double gate structure including a first gate (e.g., a top gate) and a second gate (e.g., a bottom gate), a first capacitor connected between the first gate and a second terminal (e.g., a source) of the first transistor, and a second capacitor connected between the second gate and the second terminal of the first transistor. The first capacitor may store a data voltage (or a voltage difference between the data voltage and an initialization voltage), and the second capacitor may store a threshold voltage of the first transistor in a diode connection manner. Accordingly, an image quality of the display device 600 may be increased, and power consumption of the display device 600 may be reduced.

The data driver 620 may provide data voltages VDAT to the plurality of pixels PX based on output image data ODAT and a data control signal DCTRL received from the controller 650. In some embodiments, the data control signal DCTRL may include, but is not limited to, an output data enable signal, a horizontal start signal and a load signal. In some embodiments, the data driver 620 and the controller 650 may be implemented as a single integrated circuit, and the single integrated circuit may be referred to as a timing controller embedded data driver (TED) integrated circuit. In other embodiments, the data driver 620 and the controller 650 may be implemented as separate integrated circuits.

The scan driver 630 may provide first scans signals SC1, second scans signals SC2, third scans signals SC3 and/or fourth scans signals SC4 to the plurality of pixels PX based on a scan control signal SCTRL received from the controller 650. In some embodiments, the scan control signal SCTRL may include, but is not limited to, a scan start signal and a scan clock signal. In some embodiments, the scan driver 630 may be integrated or formed in the display panel 610. In other embodiments, the scan driver 630 may be implemented as one or more integrated circuits.

The emission driver 640 may provide emission signals EM to the plurality of pixels PX based on an emission control signal EMCTRL received from the controller 650. The emission control signal EMCTRL may include, but is not limited to, an emission start signal and an emission clock signal. In some embodiments, the emission driver 640 may be integrated or formed in the display panel 610. In other embodiments, the emission driver 640 may be implemented as one or more integrated circuits.

The controller 650 (e.g., a timing controller) may receive input image data IDAT and a control signal CTRL from an external host processor (e.g., a graphics processing unit (GPU), an application processor (AP) or a graphics card). In some embodiments, the control signal CTRL may include, but is not limited to, a vertical synchronization signal, a horizontal synchronization signal, an input data enable signal, a master clock signal, etc. The controller 650 may generate the output image data ODAT, the data control signal DCTRL, the scan control signal SCTRL and the emission control signal EMCTRL based on the input image data IDAT and the control signal CTRL. The controller 650 may control an operation of the data driver 620 by providing the output image data ODAT and the data control signal DCTRL to the data driver 620, may control an operation of the scan driver 630 by providing the scan control signal SCTRL to the scan driver 630, and may control an operation of the emission driver 640 by providing the emission control signal EMCTRL to the emission driver 640.

Figure 19:
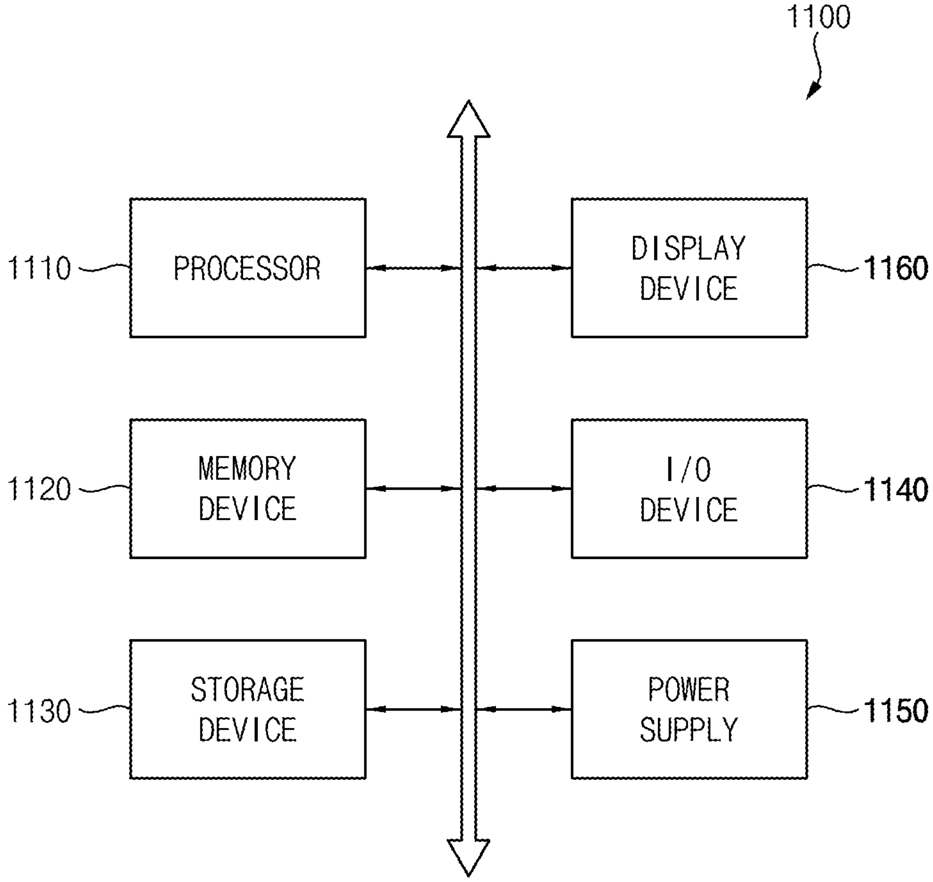
FIG. 19 is a block diagram illustrating an electronic device including a display device according to embodiments.

FIG. 19 is a block diagram illustrating an electronic device including a display device according to an embodiment.

Referring to FIG. 19, an electronic device 1100 includes a processor 1110, a memory device 1120, a storage device 1130, an input/output (I/O) device 1140, a power supply 1150, and a display device 1160. A display panel of the display device may include pixels such as the pixel 100 of FIG. 1, the pixel 200 of FIG. 10, the pixel 300 of FIG. 12 or the pixel 400 of FIG. 15. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, each pixel (e.g., 100, 200, 300, or 400) may include a first transistor having a double gate structure including a first gate (e.g., a top gate) and a second gate (e.g., a bottom gate), a first capacitor connected between the first gate and a second terminal (e.g., a source) of the first transistor, and a second capacitor connected between the second gate and the second terminal of the first transistor. The first capacitor may store a data voltage (or a voltage difference between the data voltage and an initialization voltage), and the second capacitor may store a threshold voltage of the first transistor in a diode connection manner. Accordingly, an image quality of the display device 1160 may be increased, and power consumption of the display device 1160 may be reduced.

The inventive concepts described above may be applied to any display device 1160, and any electronic device 1100 including the display device 1160. For example, the inventive concepts may be applied to a smart phone, a wearable electronic device, a tablet computer, a mobile phone, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of embodiments but is not to be construed as limiting thereof. Although a few embodiments have been described, those skilled in the art will readily appreciate that many modifications are possible in the embodiments without materially departing from the novel teachings of the present inventive concept. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A pixel of a display device, the pixel comprising:

a first transistor including a first gate connected to a first node, a first terminal connected to a second node, a second terminal connected to a third node, and a second gate connected to a fourth node;

a first capacitor including a first electrode connected to the first node, and a second electrode connected to the third node;

a second capacitor including a first electrode connected to the fourth node, and a second electrode connected to the third node;

a second transistor including a gate which receives a first scan signal, a first terminal connected to a data line which transfers a data voltage, and a second terminal connected to the first node;

a third transistor including a gate which receives a second scan signal, a first terminal connected to a line which transfers a reference voltage, and a second terminal connected to the first node;

a fourth transistor including a gate which receives a third scan signal, a first terminal connected to a line which transfers an initialization voltage, and a second terminal connected to the third node;

a fifth transistor including a gate which receives an emission signal, a first terminal connected to a line which transfers a first power supply voltage, and a second terminal connected to the second node;

a sixth transistor including a gate which receives the second scan signal, a first terminal connected to the fourth node, and a second terminal connected to the second node; and a light emitting element connected between the third node, and a line which transfers a second power supply voltage.

2. The pixel of claim 1, wherein the first capacitor stores a voltage difference between the data voltage and the initialization voltage, and wherein, in a compensation period, the second scan signal has an on-level while the first scan signal has an off-level to enable the second capacitor to store a threshold voltage of the first transistor.

3. The pixel of claim 1, wherein, in a compensation period, the third transistor applies the reference voltage to the first node, the fourth transistor applies the initialization voltage to the third node, the sixth transistor diode-connects the first transistor by connecting the fourth node to the second node, and the second capacitor stores a threshold voltage of the first transistor in a diode connection manner.

4. The pixel of claim 3, wherein the initialization voltage is higher than the reference voltage.

5. The pixel of claim 4, wherein, in the compensation period, a negative gate-source voltage is applied to the first transistor, and the threshold voltage of the first transistor is shifted in a positive direction.

6. The pixel of claim 1, wherein the first gate of the first transistor is a top gate located above an active region, and wherein the second gate of the first transistor is a bottom gate located under the active region.

7. The pixel of claim 1, wherein the first gate of the first transistor is a bottom gate located under an active region, and wherein the second gate of the first transistor is a top gate located above the active region.

8. The pixel of claim 1, wherein the third scan signal is the same as the second scan signal.

9. The pixel of claim 1, further comprising:

a seventh transistor including a gate which receives a fourth scan signal, a first terminal connected to the line which transfers the first power supply voltage, and a second terminal connected to the fourth node.

10. The pixel of claim 9, wherein frame periods for the display device include a compensation frame period in which the pixel performs a threshold voltage compensation operation, and a non-compensation frame period in which the pixel does not perform the threshold voltage compensation operation.

11. The pixel of claim 10, wherein the compensation frame period comprises:

an initialization period in which the third node and the fourth node are initialized;

a compensation period in which the threshold voltage compensation operation is performed to store a threshold voltage of the first transistor in the second capacitor;

a writing period in which a voltage difference between the data voltage and the initialization voltage is stored in the first capacitor; and an emission period in which the light emitting element emits light.

12. The pixel of claim 11, wherein, in the initialization period, the third scan signal and the fourth scan signal have an on-level, the first scan signal, the second scan signal and the emission signal have an off-level, the fourth transistor is turned on in response to the third scan signal having the on-level, and applies the initialization voltage to the third node, the seventh transistor is turned on in response to the fourth scan signal having the on-level, and applies the first power supply voltage to the fourth node, the third node is initialized based on the initialization voltage, and the fourth node is initialized based on the first power supply voltage.

13. The pixel of claim 11, wherein, in the compensation period, the second scan signal and the third scan signal have an on-level, the first scan signal, the fourth scan signal and the emission signal have an off-level, the third transistor is turned on in response to the second scan signal having the on-level, and applies the reference voltage to the first node, the fourth transistor is turned on in response to the third scan signal having the on-level, and applies the initialization voltage to the third node, the sixth transistor is turned on in response to the second scan signal having the on-level, and diode-connects the first transistor by connecting the fourth node to the second node, and the second capacitor stores the threshold voltage of the first transistor in a diode connection manner.

14. The pixel of claim 11, wherein, in the writing period, the first scan signal and the third scan signal have an on-level, the second scan signal, the fourth scan signal and the emission signal have an off-level, the second transistor is turned on in response to the first scan signal having the on-level, and applies the data voltage to the first node, the fourth transistor is turned on in response to the third scan signal having the on-level, and applies the initialization voltage to the third node, and the first capacitor stores the voltage difference between the data voltage and the initialization voltage.

15. The pixel of claim 10, wherein the non-compensation frame period comprises:

a writing period in which a voltage difference between the data voltage and the initialization voltage is stored in the first capacitor; and an emission period in which the light emitting element emits light, and wherein the non-compensation frame period does not include an initialization period and a compensation period.

16. The pixel of claim 9, wherein the first through seventh transistors are n-type metal oxide semiconductor (NMOS) transistors.

17. The pixel of claim 9, wherein the first transistor is an n-type metal oxide semiconductor (NMOS) transistor, and wherein at least one of the second through seventh transistors is a p-type metal oxide semiconductor (PMOS) transistor.

18. The pixel of claim 11, wherein, in the emission period, the emission signal has an on-level, the first scan signal, the second scan signal, the third scan signal and the fourth scan signal have an off-level, the fifth transistor is turned on in response to the emission signal having the on-level, and connects the line which transfers the first power supply voltage and the second node, the first transistor generates a driving current based on the voltage difference between the data voltage and the initialization voltage stored in the first capacitor, and the threshold voltage of the first transistor stored in the second capacitor, and the light emitting element emits light based on the driving current.

19. A pixel of a display device, the pixel comprising:

a first transistor including a first gate connected to a first node, a first terminal connected to a second node, a second terminal connected to a third node, and a second gate connected to a fourth node;

a first capacitor including a first electrode connected to the first node, and a second electrode connected to the third node;

a second capacitor including a first electrode connected to the fourth node, and a second electrode connected to the third node;

a second transistor including a gate which receives a first scan signal, a first terminal connected to a data line which transfers a data voltage, and a second terminal connected to the first node;

a third transistor including a gate which receives a second scan signal, a first terminal connected to a line which transfers a reference voltage, and a second terminal connected to the first node;

a fourth transistor including a gate which receives a third scan signal, a first terminal connected to a line which transfers an initialization voltage, and a second terminal connected to the third node;

a fifth transistor including a gate which receives an emission signal, a first terminal connected to a line which transfers a first power supply voltage, and a second terminal connected to the second node;

a sixth transistor including a gate which receives the second scan signal, a first terminal connected to the fourth node, and a second terminal connected to the second node;

a seventh transistor including a gate which receives a fourth scan signal, a first terminal connected to the line which transfers the first power supply voltage, and a second terminal connected to the fourth node; and a light emitting element connected between the third node and a line which transfers a second power supply voltage, wherein the first capacitor stores a voltage difference between the data voltage and the initialization voltage, and wherein the second capacitor stores a threshold voltage of the first transistor in a diode connection manner.

20. An electronic device comprising:

a display panel including a plurality of pixels;

a data driver configured to provide a data voltage to each of the plurality of pixels;

a scan driver configured to provide a first scan signal, a second scan signal and a third scan signal to each of the plurality of pixels;

an emission driver configured to provide an emission signal to each of the plurality of pixels; and a controller configured to control the data driver, the scan driver and the emission driver, wherein each of the plurality of pixels comprises:

a first transistor including a first gate connected to a first node, a first terminal connected to a second node, a second terminal connected to a third node, and a second gate connected to a fourth node;

a first capacitor including a first electrode connected to the first node, and a second electrode connected to the third node;

a second capacitor including a first electrode connected to the fourth node, and a second electrode connected to the third node;

a second transistor including a gate which receives the first scan signal, a first terminal connected to a data line which transfers the data voltage, and a second terminal connected to the first node;

a third transistor including a gate which receives the second scan signal, a first terminal connected to a line which transfers a reference voltage, and a second terminal connected to the first node;

a fourth transistor including a gate which receives the third scan signal, a first terminal connected to a line which transfers an initialization voltage, and a second terminal connected to the third node;

a fifth transistor including a gate which receives the emission signal, a first terminal connected to a line which transfers a first power supply voltage, and a second terminal connected to the second node;

a sixth transistor including a gate which receives the second scan signal, a first terminal connected to the fourth node, and a second terminal connected to the second node; and a light emitting element connected between the third node and a line which transfers a second power supply voltage.

* * * * *